US012641175B2

(12) United States Patent
Zhong et al.

(10) Patent No.: US 12,641,175 B2
(45) Date of Patent: May 26, 2026

(54) IMAGE DISPLAY METHOD FULLY UTLIZING SCREEN LUMINANCE RANGE FOR ELECTRONIC DEVICE, ENCODING METHOD, AND RELATED APPARATUS

(71) Applicant: HUAWEI TECHNOLOGIES CO., LTD., Shenzhen (CN)

(72) Inventors: Shuncai Zhong, Shenzhen (CN); Jinsong Wen, Shenzhen (CN); Qiyan Zhai, Shenzhen (CN); Wei Zhou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 19/020,563

(22) Filed: Jan. 14, 2025

(65) Prior Publication Data

US 2025/0150525 A1 May 8, 2025

Related U.S. Application Data

(63) Continuation of application No. PCT/CN2023/104105, filed on Jun. 29, 2023.

(30) Foreign Application Priority Data

Jul. 15, 2022 (CN) .......................... 202210831137.6

(51) Int. Cl.
*H04M 1/22* (2006.01)
*G09G 3/34* (2006.01)
(Continued)

(52) U.S. Cl.
CPC ............ *H04M 1/22* (2013.01); *G09G 3/3426* (2013.01); *H04N 23/56* (2023.01); *H04N 23/741* (2023.01);
(Continued)

(58) Field of Classification Search
None
See application file for complete search history.

(56) References Cited

U.S. PATENT DOCUMENTS

2010/0123696 A1* 5/2010 Kobiki ...................... G09G 5/00
345/207
2015/0003749 A1* 1/2015 Kim ........................ H04N 19/30
382/232
(Continued)

FOREIGN PATENT DOCUMENTS

CN 101187756 A 5/2008
CN 201340719 Y 11/2009
(Continued)

*Primary Examiner* — Donna V Bocar
(74) *Attorney, Agent, or Firm* — WOMBLE BOND DICKINSON (US) LLP

(57) ABSTRACT

This application provides an image display method for an electronic device, an encoding method, and a related apparatus. The image display method for an electronic device includes: obtaining a to-be-processed image; obtaining high-luminance enhancement data, where the high-luminance enhancement data includes a high dynamic range layer (hdrLayer); obtaining initial backlight luminance of the electronic device; obtaining target backlight luminance of the electronic device based on the initial backlight luminance; performing luminance adjustment on the to-be-processed image based on the hdrLayer to obtain a target image for the target backlight luminance; and displaying the target image at the target backlight luminance. In this application, a luminance range of a screen can be fully utilized for image display, and optimal end-to-end experience is achieved.

13 Claims, 10 Drawing Sheets

500

Obtain a to-be-processed image — 501

Obtain metadata, where the metadata includes maximum luminance of a capture scene — 502

Encode the to-be-processed image and the metadata to obtain a first bitstream — 503

(51) Int. Cl.

| | |
|---|---|
| *H04N 23/56* | (2023.01) |
| *H04N 23/741* | (2023.01) |
| *H04N 23/76* | (2023.01) |
| *G09G 3/20* | (2006.01) |
| *H04N 23/71* | (2023.01) |

(52) U.S. Cl.
CPC ........... *H04N 23/76* (2023.01); *G09G 3/2007* (2013.01); *G09G 2320/0673* (2013.01); *G09G 2320/0686* (2013.01); *G09G 2354/00* (2013.01); *H04M 2250/52* (2013.01); *H04N 23/71* (2023.01)

(56) References Cited

U.S. PATENT DOCUMENTS

| | | | |
|---|---|---|---|
| 2016/0210730 A1* | 7/2016 | Eto | ......................... H04N 19/98 |
| 2016/0358346 A1 | 12/2016 | Hendry et al. | |
| 2019/0355316 A1* | 11/2019 | Ji | .............................. G09G 3/36 |
| 2020/0105182 A1* | 4/2020 | Koo | ..................... G09G 3/3625 |
| 2020/0335048 A1* | 10/2020 | Wen | ..................... G09G 3/3406 |

FOREIGN PATENT DOCUMENTS

| | | |
|---|---|---|
| CN | 105869577 A | 8/2016 |
| CN | 107545871 A | 1/2018 |
| CN | 108510955 A | 9/2018 |
| CN | 111681620 A | 9/2020 |

* cited by examiner

500

1400

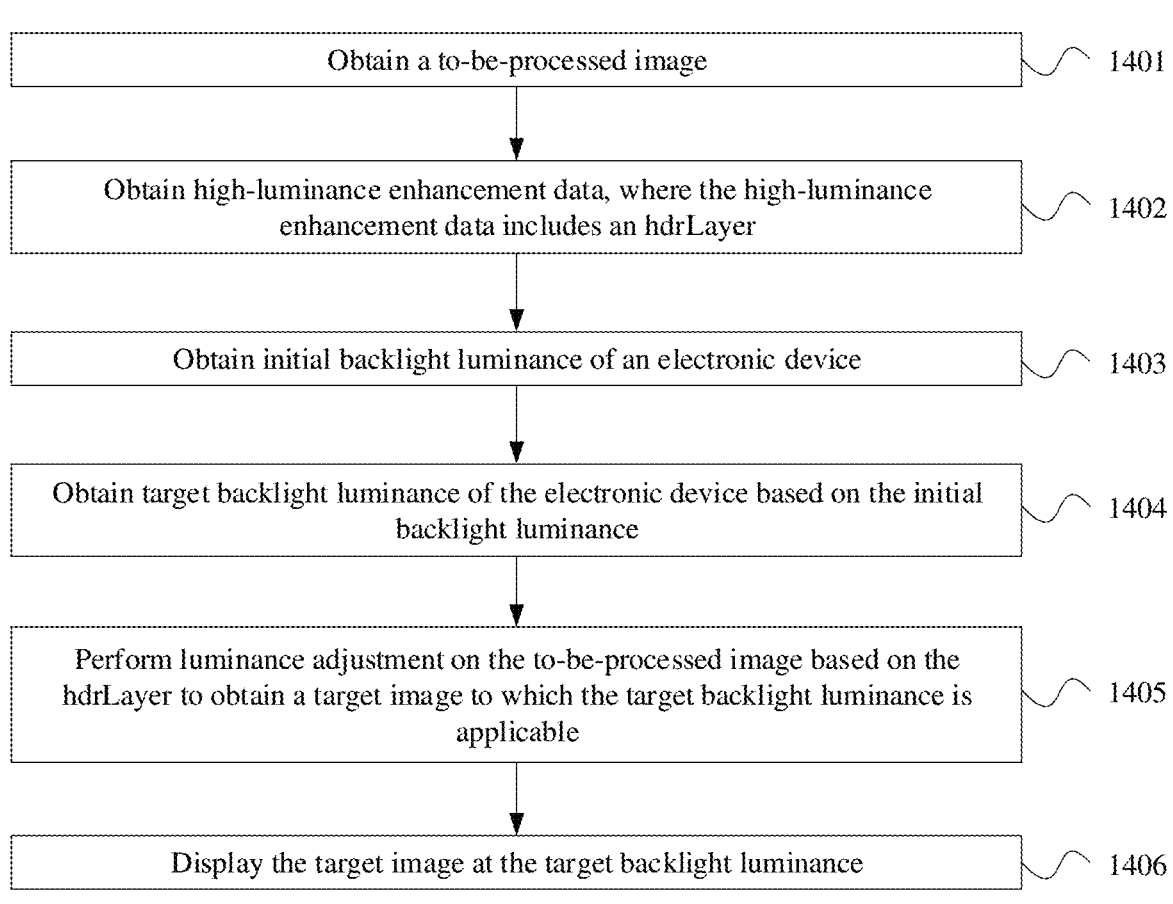

Obtain a to-be-processed image — 1401

Obtain high-luminance enhancement data, where the high-luminance enhancement data includes an hdrLayer — 1402

Obtain initial backlight luminance of an electronic device — 1403

Obtain target backlight luminance of the electronic device based on the initial backlight luminance — 1404

Perform luminance adjustment on the to-be-processed image based on the hdrLayer to obtain a target image to which the target backlight luminance is applicable — 1405

Display the target image at the target backlight luminance — 1406

FIG. 14

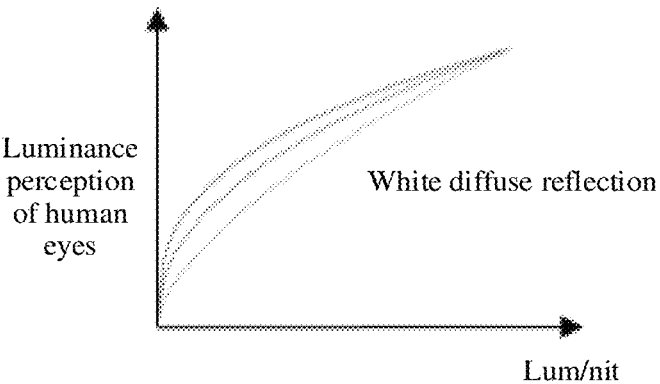

Luminance perception of human eyes

White diffuse reflection

Lum/nit

FIG. 15

IMAGE DISPLAY METHOD FULLY UTLIZING SCREEN LUMINANCE RANGE FOR ELECTRONIC DEVICE, ENCODING METHOD, AND RELATED APPARATUS

CROSS-REFERENCE TO RELATED APPLICATIONS

This application is a continuation of International Application No. PCT/CN2023/104105, filed on Jun. 29, 2023, which claims priority to Chinese Patent Application No. 202210831137.6, filed on Jul. 15, 2022. The disclosures of the aforementioned applications are hereby incorporated by reference in their entireties.

TECHNICAL FIELD

This application relates to image processing technologies, and in particular, to an image display method for an electronic device, an encoding method, and a related apparatus.

BACKGROUND

In an image capture and display system, usually, a capture side captures an image or a video and records scene content, an encoder side encodes and compresses an image, and a display side obtains an image through decoding and reconstruction, and adaptively adjusts screen luminance based on intensity of ambient light (this is an automatic backlight technology). The capture side and the encoder side may be a same electronic device or different electronic devices. As a display side, an electronic device, for example, a mobile phone or a tablet computer, generally has an automatic backlight technology, which focuses on comfort of screen luminance to human eyes. An optimal comfort range including an upper limit of comfort (excessively high luminance causes irritation to eyes) and a lower limit of comfort (excessively low luminance leads to poor visibility) is defined. In addition, screen power consumption is considered. Higher luminance leads to higher power consumption. Therefore, the screen luminance is usually adjusted based on the lower limit of comfort.

Currently, peak luminance of a screen of an electronic device may reach 1000 nits or even higher. However, only low screen luminance is used in the automatic backlight technology. For example, backlight luminance of a mobile phone under ordinary indoor ambient light is set to 100-200 nits. A large luminance range is not used, and a luminance range of the screen is not fully utilized to achieve optimal end-to-end experience.

SUMMARY

This application provides an image display method for an electronic device, an encoding method, and a related apparatus, to fully utilize a luminance range of a screen for image display, and achieve optimal end-to-end experience.

According to a first aspect, this application provides an image display method for an electronic device. The method includes: obtaining a to-be-processed image; obtaining high-luminance enhancement data, where the high-luminance enhancement data includes a high dynamic range layer hdrLayer; obtaining initial backlight luminance of the electronic device; obtaining target backlight luminance of the electronic device based on the initial backlight luminance; performing luminance adjustment on the to-be-processed image based on the hdrLayer to obtain a target image suitable for the target backlight luminance; and displaying the target image at the target backlight luminance.

In this embodiment of this application, the target backlight luminance of the electronic device is obtained based on the initial backlight luminance of the electronic device, to adjust backlight luminance of the electronic device, and fully utilize a luminance range of a screen for image display. In addition, for a region, in the to-be-processed image, in which distortion occurs due to luminance adjustment, pixel adjustment is performed based on the hdrLayer to obtain the target image suitable for the target backlight luminance, to resolve an image distortion problem. Then the target image is displayed at the target backlight luminance. The target image and the target backlight luminance match each other for display. This achieves optimal end-to-end experience.

The electronic device may be a display-side electronic device (namely, a video decoder). The target image may be displayed by a display component. The display component may be a display module integrated in the electronic device, for example, a touchscreen. Alternatively, the display component may be a display independent of the electronic device, for example, an external display connected to the electronic device, or a smart screen or a screen projected by the electronic device. This is not limited herein.

The display side receives a bitstream from a capture side, and decodes the bitstream to obtain the to-be-processed image. A decoding scheme used by the display side corresponds to an encoding scheme used by the capture side. The decoding scheme may include a standard hybrid video decoding technology, an end-to-end decoding network, a machine learning model-based decoding technology, or the like. The decoding scheme for the to-be-processed image is not limited in this embodiment of this application.

The display side may obtain the high dynamic range layer (hdrLayer). The hdrLayer may be a two-dimensional single-channel 8-bit image, and is used to mark a high-luminance region in the to-be-processed image. A resolution of the hdrLayer may be equal to a resolution of the to-be-processed image, or the resolution of the hdrLayer may be less than or greater than the resolution of the to-be-processed image. This is not limited in this application. Alternatively, the hdrLayer may be displayed in any data form that can store a plurality of parameters, for example, a two-dimensional array, a three-dimensional array, or an array with other dimensionality. A specific form of the hdrLayer is not limited in this application.

The hdrLayer mainly assists the display side in adjusting image luminance to adapt to perception of human eyes. Therefore, the display side may obtain the hdrLayer in the following three embodiments.

In one embodiment, a bitstream is received, and the bitstream is decoded to obtain the hdrLayer.

In this embodiment of this application, the capture side generates the hdrLayer, and then transmits, to the display side, a bitstream obtained by encoding the hdrLayer. The display side can restore an hdrLayer merely by decoding the bitstream. This can improve processing efficiency of the display side.

In another embodiment, a bitstream is received; the bitstream is decoded to obtain N×M groups of parameters, where each group of parameters includes k parameters, and the N×M groups of parameters correspond to N×M image blocks included in the to-be-processed image; and corresponding image blocks are processed based on the N×M groups of parameters respectively to obtain the hdrLayer, where both N and M are positive integers, N×M>1, and k>1.

In this embodiment of this application, the capture side does not directly generate the hdrLayer, but only obtains the N×M groups of parameters for generating the hdrLayer, and then encodes the N×M groups of parameters and transmits a bitstream obtained through encoding to the display side. The display side first decodes the bitstream to restore N×M groups of parameters, and then generates an hdrLayer based on the N×M groups of parameters. This can reduce a bitstream size and improve transmission efficiency.

In still another embodiment, N×M groups of parameters are generated, where each group of parameters includes k parameters, and the N×M groups of parameters correspond to N×M image blocks included in the to-be-processed image; and corresponding image blocks are processed based on the N×M groups of parameters respectively to obtain the hdrLayer, where both N and M are positive integers, N×M>1, and k>1.

In this embodiment of this application, the capture side does not need to generate the hdrLayer or obtain the N×M groups of parameters for generating the hdrLayer. The display side alone generates the N×M groups of parameters based on the to-be-processed image, and then generates the hdrLayer based on the N×M groups of parameters. This can further reduce a bitstream size and improve transmission efficiency.

In an embodiment, the to-be-processed image (a raw image) may be divided into N×M blocks, and k parameters are obtained for each image block. In this way, N×M groups of parameters can be obtained, and a total of N×M×k parameters are obtained. The k parameters of each image block may be expressed as a one-dimensional table. The N×M groups of parameters are obtained by using a machine learning model, or the N×M groups of parameters are obtained based on a histogram of the to-be-processed image.

In this embodiment of this application, the raw image may be scaled to a smaller resolution, for example, 256×256. A thumbnail enters the machine learning model (for example, a neural network), and the N×M×k parameters are obtained through learning by using the neural network. The neural network may include a local branch and a global branch. A convolution operation, downsampling, channel quantity increasing, and other processing are performed on the thumbnail. These operations are repeated, for example, are performed four times (downsampling is performed four times). In this case, the resolution becomes 16×16. Then processing is performed in the local branch. The resolution remains at 16×16 in the local branch, but convolution is performed, without downsampling. Processing is performed in the global branch. Downsampling continues to be performed in the global branch until the resolution becomes 1×1. Then an output of the local branch and an output of the global branch are added up (the resolution 16×16 and the resolution 1×1 are added up, where the resolution 1×1 is first changed to the resolution 16×16, for example, through repeated copying). Then convolution is performed, and the resolution becomes 16×16×k. Herein, k may be 9, 17, or the like, and is approximately an nth power of 2 plus 1. Finally, the N×M×k parameters are output.

It should be noted that, in this embodiment of this application, the N×M groups of parameters may alternatively be obtained in another embodiment. This is not limited herein.

In an embodiment, the N×M groups of parameters are applied to the to-be-processed image to obtain the hdrLayer. This process is essentially an interpolation process.

Values of the N×M×k parameters range from 0 to 1, or may range from 0 to 255. N and M indicate space division, and an image is divided into N×M blocks, k indicates range division, and a range is divided into k−1 segments and k fixed points. However, actually, input values are continuous, and are not exactly k values. Therefore, interpolation needs to be performed in the middle. Interpolation in space is the same. To be specific, two-dimensional interpolation is performed in space domain, and may be referred to as bilinear interpolation, and linear interpolation is performed in a range.

For example, there are N×M blocks in space domain. To ensure smoothness between blocks, four adjacent blocks need to be selected for interpolation. With respect to k for a range, luminance Y of an input raw image is continuous, but k is discontinuous. Therefore, interpolation also needs to be performed in the middle. For example, with respect to k for a range, the range is 0-255. When an output is 255, the hdrLayer is bright. When an output is 0, the hdrLayer is dark. The k values are values ranging from 0 to 255.

It should be noted that, in this embodiment of this application, the hdrLayer may alternatively be obtained in another embodiment. This is not limited herein.

In an embodiment, the high-luminance enhancement data further includes metadata. The metadata may include a dynamic range, maximum luminance, minimum luminance, or the like of a capture scene. The display side may obtain the metadata in the following two embodiments.

In a method, a bitstream is received, and the bitstream is decoded to obtain the metadata.

In another method, a bitstream is received, the bitstream is decoded to obtain a photographing parameter of the capture scene, and the metadata is obtained through calculation based on the photographing parameter.

In this embodiment of this application, the initial backlight luminance and the target backlight luminance of the electronic device are obtained in the following embodiment:

The electronic device has a backlight technology. Therefore, the initial backlight luminance of the electronic device may be set based on a surrounding environment. Refer to a related backlight technology. Details are not described herein.

To achieve good visual experience, the display side may adjust backlight of the electronic device based on luminance information related to the capture scene (for example, the dynamic range, the maximum luminance, or the minimum luminance of the capture scene) in the metadata, including increasing backlight luminance or decreasing backlight luminance. Compared with a conventional technology in which backlight luminance is decreased due to screen power consumption, in this solution, backlight luminance can be increased to fully utilize a high dynamic range (HDR) of a screen of the electronic device. Therefore, the target backlight luminance of the electronic device is greater than the initial backlight luminance of the electronic device.

For example, the display side may obtain the target backlight luminance of the electronic device by using the following two methods.

In a method, the initial backlight luminance is processed based on a preset backlight adjustment ratio to obtain the target backlight luminance.

The display side may preset a ratio, for example, a backlight increase ratio (used to increase backlight luminance, where the target backlight luminance is greater than the initial backlight luminance) or a backlight decrease ratio (used to decrease backlight luminance, where the target backlight luminance is less than the initial backlight luminance), based on a historical record, big data analysis, a screen attribute of the electronic device, or the like. The display side may process the initial backlight luminance based on the preset backlight adjustment ratio, for example, multiply the initial backlight luminance by the preset backlight adjustment ratio to obtain the target backlight luminance.

It should be noted that the method described above does not constitute a limitation. An embodiment of setting the preset backlight adjustment ratio and an embodiment of obtaining the target backlight luminance are not limited in this embodiment of this application.

In another method, a backlight adjustment ratio is obtained based on the metadata, and the initial backlight luminance is processed based on the backlight adjustment ratio to obtain the target backlight luminance.

A difference from the foregoing method lies in that the backlight adjustment ratio is not preset, and may be calculated by the display side. The backlight adjustment ratio may alternatively be a backlight increase ratio (used to increase backlight luminance, where the target backlight luminance is greater than the initial backlight luminance) or a backlight decrease ratio (used to decrease backlight luminance, where the target backlight luminance is less than the initial backlight luminance).

In this embodiment of this application, the display side may obtain a first ratio based on the maximum luminance of the capture scene, where the first ratio is a ratio of luminance perception of human eyes in the capture scene to white diffuse reflection perception; obtain a second ratio based on the first ratio, where the second ratio is a ratio of luminance perception of human eyes on the display side to white diffuse reflection perception, and the second ratio is less than or equal to the first ratio; and obtain the backlight adjustment ratio based on the second ratio.

Under different white diffuse reflection, luminance perception of human eyes usually meets a power function. As shown in FIG. 15, per=lum 1/γ, and $$\gamma = 2.3 - \frac{\log\left(\frac{lum}{50}\right)}{10}.$$

Usually, luminance perception of human eyes on the display side is weaker than luminance perception of human eyes on the capture side. Under same white diffuse reflection, the following may be obtained: P2=a×P1, where a indicates a preset coefficient, and a≤1. However, in an ideal state, luminance perception of human eyes on the display side is the same as luminance perception of human eyes on the capture side. Under same white diffuse reflection, the following may be obtained: P1=P2.

The following may be obtained through substitution into the foregoing power function:

$$P1 = L1^{1/\gamma s}$$

$$L1 = \frac{Lmax}{2 \times pi},$$

where Lmax indicates the maximum luminance of the capture scene; and $$\gamma s = 2.3 - \frac{\log\left(\frac{L1}{50}\right)}{10}.$$

$$P2 = (gainBL \times L2)^{1/\gamma d}$$

gainBL indicates the backlight adjustment ratio;

$$L2 = \frac{AmbientLum}{2 \times pi},$$

where AmbientLum indicates intensity of ambient light; and $$\gamma s = 2.3 - \frac{\log\left(\frac{L2}{50}\right)}{10}.$$

The backlight adjustment ratio may be obtained based on an equation relationship between P1 and P2:

$$gainBL = \frac{\left(a \times \left(L1^{1/\gamma s}\right)\right)^{\gamma d}}{L2}$$

In an ideal state, a=1.

The display side may process the initial backlight luminance based on the backlight adjustment ratio, for example, multiply the initial backlight luminance by the backlight adjustment ratio to obtain the target backlight luminance.

It should be noted that, in this embodiment of this application, the backlight adjustment ratio may alternatively be obtained by using another method. This is not limited herein.

In the foregoing process, to achieve an ideal state in which luminance perception of human eyes on the display side is approximately the same as luminance perception of human eyes on the capture side, the target backlight luminance of the electronic device is calculated, and backlight luminance of the electronic device is adjusted to the target backlight luminance, so that display effect for the to-be-processed image on the display side adapts to luminance perception of human eyes in a real capture scene. However, some HDR regions in the to-be-processed image may be distorted after the backlight adjustment. For example, when the target backlight luminance is greater than the initial backlight luminance, backlight luminance of the electronic device is increased. In this case, the HDR region in the to-be-processed image may be dazzling.

To ensure that luminance perception of human eyes on the display side is approximately the same as luminance perception of human eyes on the capture side, pixel processing may be performed on the to-be-processed image to adjust pixel values of some regions, so that luminance of the regions is the same as luminance used before the backlight adjustment, to avoid irritation to eyes.

In this embodiment of this application, pixel values of some regions may be adjusted by using the following method: The display side obtains a target weight based on the hdrLayer. For example, the display side may divide a first pixel value in the hdrLayer by a preset threshold to obtain a first weight value of the first pixel value, where the first pixel value is any pixel value in the hdrLayer, and the target weight includes the first weight value; and then perform luminance adjustment on the to-be-processed image based on the target weight to obtain the target image.

For example, the foregoing process may be expressed as the following formulas:

$$pixelLow = pow(1/gainBL, 1/2.2) \times pixelSrc;$$

$$weight = hdrLayer/255;$$

$$pixelOut = pixelSrc \times weight + pixelLow \times (1 - weight),$$

where pow(1/gainBL, 1/2.2) indicates a pixel adjustment coefficient, pixelSrc indicates any pixel value in the to-be-processed image, pixelLow indicates a pixel value obtained by adjusting the any pixel value, weight indicates the target weight, and pixelOut indicates a target pixel value corresponding to the any pixel value.

In an embodiment, in this embodiment of this application, the hdrLayer may alternatively be used as a guide picture or a reference picture. A correspondence between a pixel value in the to-be-processed image and a pixel value in the target image is obtained, and then the pixel value in the to-be-processed image is processed based on the correspondence to obtain the target image.

In addition, in this embodiment of this application, pixel values of some regions may alternatively be adjusted by using another method to obtain the target image. This is not limited herein.

All pixels in the to-be-processed image may be processed by using the foregoing method to obtain the target image. In an embodiment, when a resolution of the hdrLayer is less than or greater than a resolution of the to-be-processed image, super-resolution image processing or downsampling may be first performed on the hdrLayer, so that the resolution of the hdrLayer is equal to the resolution of the to-be-processed image, and then the target image is obtained by using the foregoing formulas.

In this embodiment of this application, if backlight luminance of the electronic device is increased, some regions of the to-be-processed image may be excessively bright, causing irritation to eyes. Therefore, pixel adjustment may be performed based on the hdrLayer to decrease pixel luminance of the regions and avoid irritation to eyes. If backlight luminance of the electronic device is decreased, some regions of the to-be-processed image may be excessively dark, causing loss of details. Therefore, pixel adjustment may be performed based on the hdrLayer to increase pixel luminance of the regions and avoid loss of details.

According to a second aspect, this application provides an encoding method, including: obtaining a to-be-processed image; obtaining metadata, where the metadata includes maximum luminance of a capture scene; and encoding the to-be-processed image and the metadata to obtain a first bitstream.

A capture side uses any capture device, for example, a camera, to capture, for a same scene, a plurality of frames of pictures under different exposure conditions, for example, a long-exposure picture (L (long) frame), a normal-exposure picture (N (normal) frame), and a short-exposure picture (S (short) frame). Exposure time of the L frame is long. Therefore, a quite dark region in the scene can also be clearly photographed, but a bright region is overexposed. The N frame is a normal-exposure frame. A region with medium luminance in the scene is quite good, but a quite bright region is overexposed, and a quite dark region is unclear. Exposure time of the S frame is short. Therefore, a quite bright region in the scene is not overexposed, but a region with medium luminance and a dark region are dark and unclear. Multi-frame fusion is performed on the plurality of frames of pictures (the L frame, the N frame, and the S frame) to generate a picture with a large quantity of bits (bit). The picture with a large quantity of bits integrates the L frame, the N frame, and the S frame. This can leverage advantages of the plurality of frames and eliminate disadvantages of the plurality of frames. For example, a quite bright region in the scene is not overexposed, a region with medium luminance is quite good, and a quite dark region is also quite clear. Then dynamic range compression (DRC) and other processing are performed on the picture with a large quantity of bits to obtain an 8-bit fusion picture. In this embodiment of this application, the 8-bit fusion picture is the to-be-processed image.

During DRC processing on the picture, the capture side may obtain metadata information, such as a dynamic range, maximum luminance, and minimum luminance, of the capture scene. The capture scene is a scene in which the capture side captures the to-be-processed image (a raw image). For example, the capture scene is outdoor at noon, outdoor after dark, outdoor on a cloudy day, or indoor with light.

In an embodiment, the capture side may obtain the metadata based on the L frame, the N frame, and the S frame.

In an embodiment, the capture side may obtain the metadata through calculation based on a preset photographing parameter.

After obtaining the to-be-processed image and the metadata, the capture side may encode the to-be-processed image and the metadata to obtain the first bitstream. An encoding scheme used by the capture side to encode the to-be-processed image may include a standard hybrid video encoding technology, an end-to-end encoding network, a machine learning model-based encoding technology, or the like. The encoding scheme for the to-be-processed image is not limited in this embodiment of this application. The metadata may be encoded into a reserved field of a bitstream, for example, an appn field in JPG. In addition, the capture side may alternatively encode the metadata by using another method. This is not limited herein.

In this embodiment of this application, a high dynamic range layer (hdrLayer) may be obtained. The hdrLayer may be a two-dimensional single-channel 8-bit image, and is used to mark a high-luminance region in the to-be-processed image. A resolution of the hdrLayer may be equal to a resolution of the to-be-processed image, or the resolution of the hdrLayer may be less than or greater than the resolution of the to-be-processed image. When the resolution of the hdrLayer is less than or greater than the resolution of the to-be-processed image, a display side may perform super-resolution image processing or downsampling on the hdrLayer, to match the to-be-processed image. In this way, required storage space can be reduced. This is not limited in this embodiment of this application. Alternatively, the hdrLayer may be displayed in any data form that can store a plurality of parameters, for example, a two-dimensional array, a three-dimensional array, or an array with other dimensionality. A specific form of the hdrLayer is not limited in this application.

The hdrLayer is a grayscale image, and may mark a high-luminance region in the raw image. A larger value indicates higher luminance of the raw image. Therefore, the hdrLayer is bright for a region with high luminance in the raw image, and the hdrLayer is dark for a region with low luminance in the raw image.

The hdrLayer mainly assists the display side in adjusting image luminance to adapt to perception of human eyes. Therefore, the display side needs to obtain the hdrLayer. The capture side may assist, in the following two embodiments, the display side in obtaining the hdrLayer.

In one embodiment, the capture side generates N×M groups of parameters, where each group of parameters includes k parameters, the N×M groups of parameters correspond to N×M image blocks included in the to-be-processed image, both N and M are positive integers, N×M>1, and k>1; and encodes the N×M groups of parameters to obtain a second bitstream.

The N×M groups of parameters are used for generating an hdrLayer. Therefore, to reduce a bitstream size, the capture side may not directly generate an hdrLayer, but transmit, to the display side, the second bitstream obtained by encoding the N×M groups of parameters for generating an hdrLayer. Then the display side decodes the bitstream to restore N×M groups of parameters, and then generates an hdrLayer based on the N×M groups of parameters. This can improve transmission efficiency.

In addition to obtaining the metadata, the capture side may further generate the N×M groups of parameters, and then encode the metadata, the to-be-processed image, and the N×M groups of parameters to obtain the first bitstream and the second bitstream, and may further transmit the first bitstream and the second bitstream to the display side. It should be noted that the first bitstream and the second bitstream may be sequentially concatenated into one bitstream, or may be combined into one bitstream in another preset embodiment, or may be transmitted one by one as separate bitstreams. This is not limited herein.

In another embodiment, the capture side generates N×M groups of parameters, where each group of parameters includes k parameters, the N×M groups of parameters correspond to N×M image blocks included in the to-be-processed image, both N and M are positive integers, N×M>1, and k>1; processes the corresponding image blocks based on the N×M groups of parameters respectively to obtain a high dynamic range layer hdrLayer; and encodes the hdrLayer to obtain a third bitstream.

Alternatively, the capture side may generate an hdrLayer based on N×M groups of parameters, and then transmit, to the display side, a third bitstream obtained by encoding the hdrLayer. Then the display side decodes the bitstream to restore an hdrLayer. This can improve processing efficiency of the display side.

In addition to obtaining the metadata, the capture side may further generate the hdrLayer, and then encode the metadata, the to-be-processed image, and the hdrLayer to obtain the first bitstream and the third bitstream, and may further transmit the first bitstream and the third bitstream to the display side. It should be noted that the first bitstream and the third bitstream may be sequentially concatenated into one bitstream, or may be combined into one bitstream in another preset embodiment, or may be transmitted one by one as separate bitstreams. This is not limited herein.

Alternatively, in addition to the first bitstream, the capture side may transmit both the second bitstream and the third bitstream to the display side. In this case, the first bitstream, the second bitstream, and the third bitstream may be sequentially concatenated into one bitstream, or may be combined into one bitstream in a preset embodiment, or may be transmitted one by one as separate bitstreams. This is not limited herein.

In this embodiment of this application, the N×M groups of parameters may be obtained by using a machine learning model, or the N×M groups of parameters may be obtained based on a histogram of the to-be-processed image. For an embodiment of obtaining the N×M groups of parameters, refer to related descriptions in the first aspect. Details are not described herein again.

According to a third aspect, this application provides an image display apparatus for an electronic device. The apparatus includes: an obtaining module, configured to: obtain a to-be-processed image; obtain high-luminance enhancement data, where the high-luminance enhancement data includes a high dynamic range layer hdrLayer; obtain initial backlight luminance of the electronic device; and obtain target backlight luminance of the electronic device based on the initial backlight luminance; an adjustment module, configured to perform luminance adjustment on the to-be-processed image based on the hdrLayer to obtain a target image suitable for the target backlight luminance; and a display module, configured to display the target image at the target backlight luminance.

In an embodiment, the obtaining module is configured to receive a bitstream and decode the bitstream to obtain the hdrLayer.

In an embodiment, the obtaining module is configured to: receive a bitstream and decode the bitstream to obtain N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain the hdrLayer.

In an embodiment, the obtaining module is configured to: generate N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain the hdrLayer.

In an embodiment, the obtaining module is configured to process the initial backlight luminance based on a preset backlight adjustment ratio to obtain the target backlight luminance.

In an embodiment, the high-luminance enhancement data further includes metadata; and the obtaining module is configured to: obtain a backlight adjustment ratio based on the metadata; and process the initial backlight luminance based on the backlight adjustment ratio to obtain the target backlight luminance.

In an embodiment, the adjustment module is configured to: obtain a target weight based on the hdrLayer; and perform luminance adjustment on the to-be-processed image based on the target weight to obtain the target image.

In an embodiment, the adjustment module is configured to divide a first pixel value in the hdrLayer by a preset threshold to obtain a first weight value of the first pixel value, where the first pixel value is any pixel value in the hdrLayer, and the target weight includes the first weight value.

In an embodiment, the adjustment module is configured to: obtain a pixel adjustment coefficient; obtain an adjusted image based on the pixel adjustment coefficient and the to-be-processed image; and obtain the target image based on the to-be-processed image, the adjusted image, and the target weight.

In an embodiment, the N×M groups of parameters are obtained by using a machine learning model, or the N×M groups of parameters are obtained based on a histogram of the to-be-processed image.

In an embodiment, the metadata includes maximum luminance of a capture scene; and the obtaining module is configured to: obtain a first ratio based on the maximum luminance of the capture scene, where the first ratio is a ratio of luminance perception of human eyes in the capture scene to white diffuse reflection perception; obtain a second ratio based on the first ratio, where the second ratio is a ratio of luminance perception of human eyes on a display side to white diffuse reflection perception, and the second ratio is less than or equal to the first ratio; and obtain the backlight adjustment ratio based on the second ratio.

In an embodiment, the obtaining module is configured to calculate the first ratio based on the following formula:

$$P1 = L1^{1/\gamma s}, \text{ where}$$

$$L1 = \frac{Lmax}{2 \times pi},$$

P1 indicates the first ratio;

where Lmax indicates the maximum luminance of the capture scene; and $$\gamma s = 2.3 - \frac{\log\left(\frac{L1}{50}\right)}{10}.$$

In an embodiment, the obtaining module is configured to calculate the second ratio based on the following formula:

$$P2 = a \times P1,$$

where

P2 indicates the second ratio; and a indicates a preset coefficient, and a≤1.

In an embodiment, the obtaining module is configured to calculate the backlight adjustment ratio based on the following formula:

$$gainBL = \frac{P2^{\gamma d}}{L2},$$

where gainBL indicates the backlight adjustment ratio;

$$L2 = \frac{AmbientLum}{2 \times pi},$$

where AmbientLum indicates intensity of ambient light; and $$\gamma d = 2.3 - \frac{\log\left(\frac{L2}{50}\right)}{10}.$$

In an embodiment, the metadata is obtained in the following embodiment: decoding a bitstream to obtain the metadata; or receiving a bitstream, decoding the bitstream to obtain a photographing parameter of a capture scene, and then obtaining the metadata through calculation based on the photographing parameter.

In an embodiment, the metadata further includes minimum luminance of the capture scene and/or a dynamic range of the capture scene.

According to a fourth aspect, this application provides an encoding apparatus, including: an obtaining module, configured to: obtain a to-be-processed image; and obtain metadata, where the metadata includes maximum luminance of a capture scene; and an encoding module, configured to encode the to-be-processed image and the metadata to obtain a first bitstream.

In an embodiment, the obtaining module is further configured to generate N×M groups of parameters, where each group of parameters includes k parameters, the N×M groups of parameters correspond to N×M image blocks included in the to-be-processed image, both N and M are positive integers, N×M>1, and k>1; and the encoding module is further configured to encode the N×M groups of parameters to obtain a second bitstream.

In an embodiment, the obtaining module is further configured to: generate N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain a high dynamic range layer hdrLayer; and the encoding module is further configured to encode the hdrLayer to obtain a third bitstream.

In an embodiment, the N×M groups of parameters are obtained by using a machine learning model, or the N×M groups of parameters are obtained based on a histogram of the to-be-processed image.

In an embodiment, the obtaining module is configured to: obtain the metadata based on a long-exposure picture, a normal-exposure picture, and a short-exposure picture; or obtain the metadata through calculation based on a preset photographing parameter.

In an embodiment, the metadata further includes minimum luminance of the capture scene and/or a dynamic range of the capture scene.

According to a fifth aspect, this application provides a decoder, including: one or more processors; and a memory, configured to store one or more programs. When the one or more programs are executed by the one or more processors, the one or more processors are enabled to implement the method according to any one of the implementations of the first aspect.

According to a sixth aspect, this application provides an encoder, including: one or more processors; and a memory, configured to store one or more programs. When the one or more programs are executed by the one or more processors, the one or more processors are enabled to implement the method according to any one of the implementations of the second aspect.

According to a seventh aspect, this application provides a computer-readable storage medium, including a computer program. When the computer program is executed on a computer, the computer is enabled to perform the method according to any one of the implementations of the first aspect and the second aspect.

According to an eighth aspect, this application provides a computer program product. The computer program product includes instructions. When the instructions are run on a computer or a processor, the computer or the processor is enabled to implement the method according to any one of the implementations of the first aspect and the second aspect.

According to a ninth aspect, this application provides a bitstream. The bitstream may be stored in a computer-readable storage medium, or may be transmitted in a form of a signal, for example, an electromagnetic wave. The bitstream includes encoded image data and metadata, and the metadata includes maximum luminance of a capture scene. The capture scene is a scene in which a pre-encoding image is captured.

According to a tenth aspect, this application provides an image capture and display system, including a capture-side electronic device and a display-side electronic device. The capture-side electronic device may include the encoder according to the sixth aspect. The display-side electronic device may include the decoder according to the fifth aspect.

According to an eleventh aspect, this application provides a chip system. The chip system includes a logic circuit and an input/output interface. The input/output interface is configured to communicate with another communication apparatus outside the chip system. The logic circuit is configured to perform the method according to any one of the implementations of the first aspect and the second aspect.

According to a twelfth aspect, this application provides a computer-readable storage medium. The computer-readable storage medium stores a to-be-decoded bitstream, or stores a bitstream obtained through encoding. The bitstream is obtained by using the encoding method according to any one of the second aspect or the implementations of the second aspect.

BRIEF DESCRIPTION OF DRAWINGS

FIG. 14 is a flowchart of a process 1400 of an image processing method according to an embodiment of this application;

FIG. 15 is a diagram of luminance perception of human eyes and white diffuse reflection;

DESCRIPTION OF EMBODIMENTS

Figure 1:
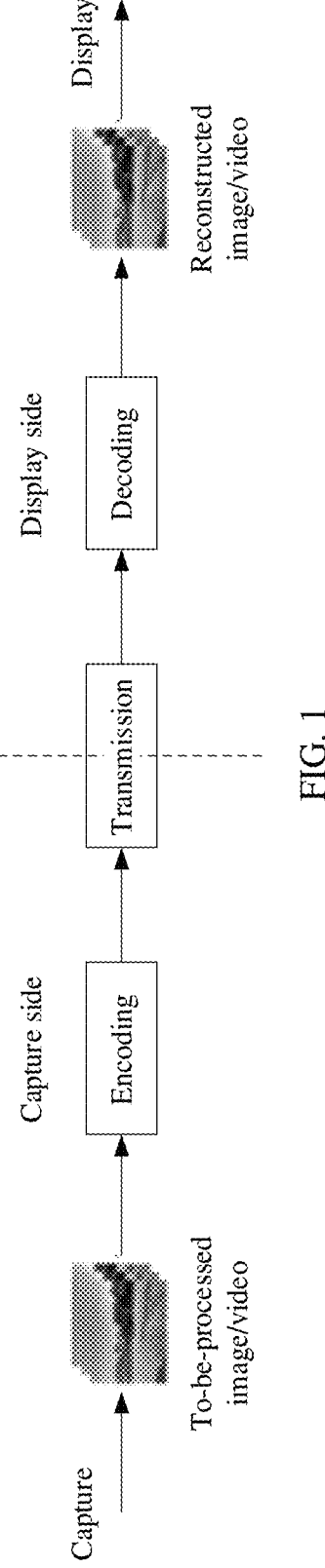
FIG. 1 is a diagram of an image capture and display system.

To make objectives, technical solutions, and advantages of this application clearer, the following clearly and describes the technical solutions in this application with reference to accompanying drawings in this application. Clearly, the described embodiments are merely some but not all of embodiments of this application. All other embodiments obtained by a person of ordinary skill in the art based on embodiments of this application without creative efforts shall fall within the protection scope of this application.

In embodiments of this specification, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of operations or units. A method, system, product, or device is not necessarily limited to those expressly listed operations or units, but may include other operations or units that are not expressly listed or that are inherent to such a process, method, product, or device.

It should be understood that, in this application, "at least one" means one or more, and "a plurality of" means two or more. The term "and/or" describes an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items" or a similar expression indicates any combination of the items, including one of the items or any combination of a plurality of the items. For example, at least one of a, b, or c may indicate a, b, c, "a and b", "a and c", "b and c", or "a, b, and c", where a, b, and c may be singular or plural.

Embodiments of this application relate to application of a machine learning model. For ease of understanding, the following first describes related nouns or terms.

1. Neural Network

A neural network (NN) is a machine learning model. The neural network may include neurons. The neuron may be an operation unit that uses xs and an intercept of 1 as inputs. An output of the operation unit may be as follows:

$$h_{W,b}(x) = f(W^T x) = f\left(\sum_{s=1}^{n} W_s x_s + b\right) \tag{1-1}$$

s=1, 2, . . . , or n, n is a natural number greater than 1, Ws is a weight of xs, and b is bias of the neuron. f is an activation function of the neuron, and is used to introduce a nonlinear feature into the neural network to convert an input signal in the neuron into an output signal. The output signal of the activation function may be used as an input for a next convolutional layer. The activation function may be a non-linear function, for example, a ReLU. The neural network is a network formed by connecting many individual neurons together. To be specific, an output of a neuron may be an input for another neuron. An input for each neuron may be connected to a local receptive field of a previous layer to extract a feature of the local receptive field. The local receptive field may be a region including several neurons.

2. Multi-Layer Perceptron (MLP)

An MLP is a simple deep neural network (DNN) (different layers are fully connected), and is also referred to as a multi-layer neural network. The MLP may be understood as a neural network including many hidden layers. There is no special measurement criterion for the "many" herein. The DNN is divided based on locations of different layers, and a neural network in the DNN may be divided into three types: an input layer, a hidden layer, and an output layer. Usually, a first layer is the input layer, a last layer is the output layer, and intermediate layers are all hidden layers. Layers are fully connected. To be specific, any neuron at an $i^{th}$ layer is necessarily connected to any neuron at an $(i+1)^{th}$ layer. Although the DNN seems complex, an operation at each layer is not complex, and is simply expressed by the following linear relationship expression: $\vec{y}=\alpha(W\vec{x}+\vec{b})$, where $\vec{x}$ is an input vector, $\vec{y}$ is an output vector, $\vec{b}$ is an offset vector, W is a weight matrix (also referred to as a coefficient), and $\alpha(\ )$ is an activation function. At each layer, the output vector $\vec{y}$ is obtained merely by performing such a simple operation on the input vector $\vec{x}$. Because the DNN includes many layers, there are also a large quantity of coefficients W and offset vectors $\vec{b}$. These parameters in the DNN are defined as follows: The coefficient W is used as an example. It is assumed that, in a three-layer DNN, a linear coefficient from a $4^{th}$ neuron at a $2^{nd}$ layer to a $2^{nd}$ neuron at a $3^{rd}$ layer is defined as $w_{24}^{3}$. The superscript 3 indicates a layer at which the coefficient W is located, and the subscript corresponds to an output third-layer index 2 and an input second-layer index 4. To sum up, a coefficient from a $k^{th}$ neuron at an $(L-1)^{th}$ layer to a $j^{th}$ neuron at an $L^{th}$ layer is defined as $W_{jk}^{L}$. It should be noted that the input layer does not have the W parameter. In the deep neural network, a larger quantity of hidden layers enable the network to better describe a complex case in the real world. Theoretically, a model with more parameters has higher complexity and a larger "capacity". This means that the model can perform a more complex learning task. Training for the deep neural network is a process of learning a weight matrix, and a final objective of the training is to obtain a weight matrix (a weight matrix including vectors W of many layers) for all layers of a trained deep neural network.

3. Convolutional Neural Network

A convolutional neural network (CNN) is a deep neural network with a convolutional structure and is a deep learning architecture. In the deep learning architecture, multi-layer learning is performed at different abstraction layers by using a machine learning algorithm. As a deep learning architecture, the CNN is a feed-forward artificial neural network. Neurons in the feed-forward artificial neural network may respond to an image input to the neural network.

The convolutional neural network includes a feature extractor that includes a convolutional layer and a pooling layer. The feature extractor may be considered as a filter. A convolution process may be considered as using a trainable filter to perform convolution on an input image or a convolutional feature plane.

The convolutional layer is a neuron layer, in the convolutional neural network, at which convolution is performed on an input signal. The convolutional layer may include a plurality of convolution operators. The convolution operator is also referred to as a kernel. In image processing, the convolution operator is equivalent to a filter for extracting specific information from an input image matrix. The convolution operator may be essentially a weight matrix, and the weight matrix is usually predefined. During a convolution operation on an image, the weight matrix usually performs processing on the input image pixel by pixel (or two pixels by two pixels, or the like, depending on a value of a stride) in a horizontal direction, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolutional output with a single depth dimension is generated through convolution with a single weight matrix. However, in most cases, no single weight matrix is used, but a plurality of weight matrices with a same size (rows×columns), namely, a plurality of matrices of a same type, are used. Outputs of all the weight matrices are stacked to form a depth dimension of a convolutional image. The dimension herein may be understood as being determined based on the foregoing "plurality". Different weight matrices may be used to extract different features from the image. For example, a weight matrix is used to extract edge information of the image, another weight matrix is used to extract a specific color of the image, and still another weight matrix is used to blur unnecessary noise in the image. The plurality of weight matrices have a same size (rows×columns). Feature maps extracted from the plurality of weight matrices with the same size also have a same size. Then the plurality of extracted feature maps with the same size are combined into an output of the convolution operation. Weight values in the weight matrices need to be obtained through a large amount of training in actual application. Each weight matrix including weight values obtained through training may be used to extract information from the input image, so that the convolutional neural network performs correct prediction. When the convolutional neural network has a plurality of convolutional layers, a large quantity of general features are usually extracted at an initial convolutional layer. The general feature may also be referred to as a low-level feature. With an increase in a depth of the convolutional neural network, a feature extracted at a subsequent convolutional layer is more complex, for example, is a high-level semantic feature. A feature with higher-level semantics is more suitable for a to-be-resolved problem.

A quantity of training parameters usually needs to be reduced. Therefore, pooling layers usually need to be periodically introduced after convolutional layers. One convolutional layer may be followed by one pooling layer, or a plurality of convolutional layers may be followed by one or more pooling layers. During image processing, the pooling layer is only used to reduce a spatial size of the image. The pooling layer may include an average pooling operator and/or a max pooling operator, to perform sampling on the input image to obtain an image with a small size. The average pooling operator may be used to perform calculation on pixel values in the image within a specific range to generate an average value as a result of average pooling. The max pooling operator may be used to select a pixel with a largest value within a specific range as a result of max pooling. In addition, similar to that the size of the weight matrix at the convolutional layer should be related to the size of the image, an operator at the pooling layer should also be related to the size of the image. A size of a processed image output by the pooling layer may be less than a size of an image input to the pooling layer. Each pixel in the image output by the pooling layer indicates an average value or a maximum value of a corresponding sub-region of the image input to the pooling layer.

After processing is performed at the convolutional layer or the pooling layer, the convolutional neural network is not yet ready to output required output information. A reason lies in that, as described above, at the convolutional layer or the pooling layer, only a feature is extracted, and a quantity of parameters resulting from the input image is reduced. However, to generate final output information (required class information or other related information), the convolutional neural network needs to generate, by using a neural network layer, an output corresponding to a quantity of one or a group of required classes. Therefore, the neural network layer may include a plurality of hidden layers. Parameters included in the plurality of hidden layers may be obtained through pre-training based on related training data of a specific task type. For example, the task type may include image recognition, image classification, or super-resolution image reconstruction.

In an embodiment, the neural network layer further includes an output layer of the entire convolutional neural network after the plurality of hidden layers. The output layer has a loss function similar to categorical cross-entropy, and the loss function is used to calculate a prediction error. When forward propagation of the entire convolutional neural network is completed, back propagation is started to update a weight value and a deviation of each of the foregoing layers, to reduce a loss of the convolutional neural network and an error between a result output by the convolutional neural network through the output layer and an ideal result.

4. Recurrent Neural Network

A recurrent neural network (RNN) is used to process sequence data. In a conventional neural network model, layers from an input layer to a hidden layer and to an output layer are fully connected, but nodes at each layer are not connected. This common neural network helps resolve many problems, but is still incapable of resolving many other problems. For example, to predict a next word in a sentence, a previous word usually needs to be used, because the previous word and the next word in the sentence are not independent of each other. A reason why the RNN is referred to as the recurrent neural network is that a current output of a sequence is also related to a previous output of the sequence. A specific representation form is that the network memorizes previous information and applies the previous information to calculation of the current output. To be specific, nodes at the hidden layer are connected to each other, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used. However, a difference lies in that, if the RNN is expanded, a parameter, for example, W, of the RNN is shared. This is different from the conventional neural network described in the foregoing example. In addition, during use of a gradient descent algorithm, an output in each operation depends not only on a network in a current operation, but also on a network status in several previous operations. This learning algorithm is referred to as a back propagation through time (BPTT) algorithm.

Why is the recurrent neural network still required when the convolutional neural network is available? A reason is simple. In the convolutional neural network, it is assumed that elements are independent of each other, and an input and an output, for example, a cat and a dog, are also independent of each other. However, in the real world, many elements are connected to each other. For example, stocks change over time. For another example, a person says: "I like traveling, and my favorite place is Yunnan. I will go there when I have a chance." Herein, people should know that the person will go to "Yunnan". This is because people perform inference from a context. However, how does a machine do that? In this case, the RNN emerges correspondingly. The RNN is intended to make a machine capable of memorizing like a human. Therefore, an output of the RNN needs to depend on current input information and historical memorized information.

5. Loss Function

During training for a deep neural network, because an output of the deep neural network is expected to be close, as much as possible, to a predicted value that is actually expected, a predicted value of a current network may be compared with a target value that is actually expected, and then a weight vector of each layer of the neural network is updated based on a difference between the predicted value and the target value (certainly, before a 1st update, an initialization process is usually performed, to be specific, parameters are preconfigured for all layers of the deep neural network). For example, if the predicted value of the network is large, the weight vector is adjusted to decrease the predicted value, and adjustment is continuously performed until the deep neural network can obtain, through prediction, the target value that is actually expected or a value that is quite close to the target value that is actually expected. Therefore, "how to obtain, through comparison, a difference between a predicted value and a target value" needs to be predefined. This is a loss function or an objective function. The loss function and the objective function are important equations for measuring a difference between a predicted value and a target value. The loss function is used as an example. A larger output value (loss) of the loss function indicates a greater difference. Therefore, the training for the deep neural network is a process of minimizing the loss.

6. Back Propagation Algorithm

During training, a convolutional neural network may correct a value of a parameter in an initial super-resolution model by using an error back propagation (BP) algorithm, so that a reconstruction error loss of the super-resolution model becomes smaller. In an embodiment, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, for example, a weight matrix, of an optimal super-resolution model.

7. Generative Adversarial Network

A generative adversarial network (GAN) is a deep learning model. The model includes at least two modules. One module is a generative model, and the other module is a discriminative model. Learning is performed through gaming between the two modules, to generate a better output. Both the generative model and the discriminative model may be neural networks, and may be deep neural networks or convolutional neural networks. A basic principle of the GAN is as follows: A GAN for generating a picture is used as an example. It is assumed that there are two networks: G (Generator) and D (Discriminator). G is a network for generating a picture. G receives random noise z, and generates a picture based on the noise, where the picture is denoted as G (z). D is a discriminative network for determining whether a picture is "real". An input parameter of D is x, where x indicates a picture. An output D (x) indicates a probability that x is a real picture. If a value of D (x) is 1, it indicates that the picture is 100% a real picture. If a value of D (x) is 0, it indicates that the picture cannot be a real picture. During training for the generative adversarial network, an objective of the generative network G is to generate a picture that is as real as possible to deceive the discriminative network D, and an objective of the discriminative network D is to distinguish between the picture generated by G and a real picture. In this way, G and D constitute a dynamic "gaming" process, namely, an "adversarial" process in the "generative adversarial network". A final gaming result is as follows: In an ideal state, G may generate a picture G (z) that "seems real", and it is difficult for D to determine whether the picture generated by G is real, to be specific, D (G (z))=0.5. In this way, a superb generative model G is obtained, and may be used to generate a picture.

FIG. 1 is a diagram of an image capture and display system. As shown in FIG. 1, in the image capture and display system, usually, a capture side (for example, an electronic device such as an image shooting device, a camera, or a surveillance camera) captures an image or a video, records scene content, and encodes and compresses the image; and a display side (for example, an electronic device such as a mobile phone, a tablet computer, or a smart screen) obtains an image through decoding and reconstruction, and adaptively adjusts screen luminance based on intensity of ambient light (this is an automatic backlight technology).

As a display side, an electronic device, for example, a mobile phone, a tablet computer, or a smart screen, generally has an automatic backlight technology, which focuses on comfort of screen luminance for human eyes. An optimal comfort range including an upper limit of comfort (excessively high luminance causes irritation to eyes) and a lower limit of comfort (excessively low luminance leads to poor visibility) is defined. In addition, screen power consumption is considered. Higher luminance leads to higher power consumption. Therefore, the screen luminance is usually adjusted based on the lower limit of comfort. Currently, peak luminance of a screen of an electronic device may reach 1000 nits or even higher. However, only low screen luminance is used in the automatic backlight technology. For example, backlight luminance of a mobile phone under ordinary indoor ambient light is set to 100-200 nits. A large luminance range is not used, and a luminance range of the screen is not fully utilized for image display to achieve optimal end-to-end experience.

It should be noted that the foregoing content describes an example implementation of the image capture and display system. In an embodiment, some or all functions of the capture side and the display side may alternatively be integrated into one electronic device. Alternatively, image capture and image encoding may be implemented by different electronic devices, and a method provided in embodiments of this application is applied to an electronic device with an image encoding function and/or an image decoding function. Alternatively, an image decoding function and a display function may be implemented by different electronic devices, for example, in a scenario of projection for display or in a scenario in which an external display is connected. To sum up, an application scenario is not limited in embodiments of this application.

Therefore, embodiments of this application provide an image encoding and processing method, to fully utilize a luminance range of a screen for image display and achieve optimal end-to-end experience.

Figure 2A:
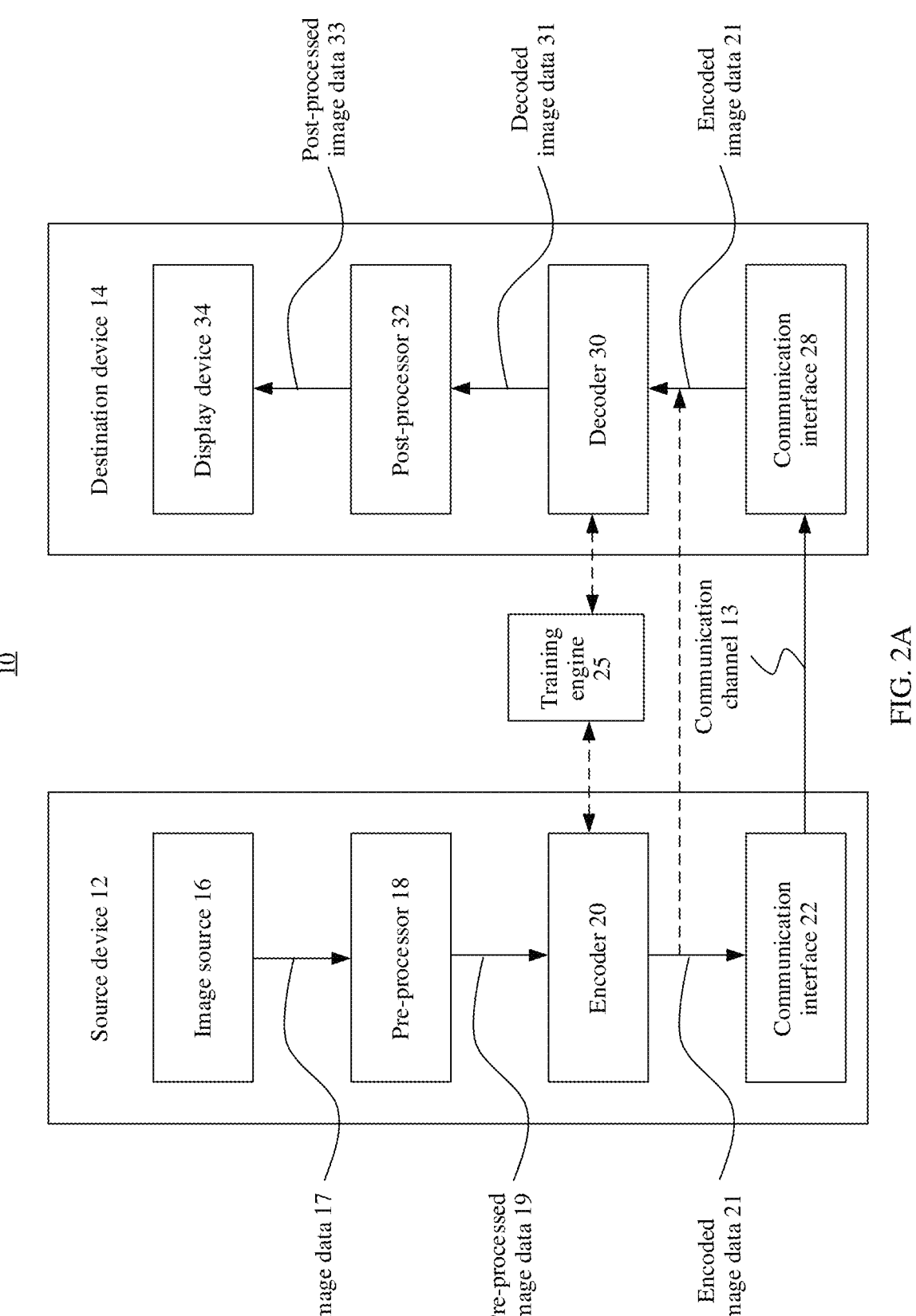
FIG. 2A is a block diagram of an example coding system 10.

The image capture and display system shown in FIG. 1 is used as an example. In addition to capturing an image, the capture side further has a function of encoding an image. Before displaying an image, the display side needs to obtain the image through decoding and reconstruction. Therefore, the image capture and display system may also be considered as a coding system. FIG. 2A is a block diagram of an example coding system 10. A video encoder 20 (or referred to as an encoder 20 for short) and a video decoder 30 (or referred to as a decoder 30 for short) in the coding system 10 may be configured to perform various example solutions described in embodiments of this application.

As shown in FIG. 2A, the coding system 10 includes a source device 12. The source device 12 is configured to provide encoded image data 21, for example, an encoded image, for a destination device 14 for decoding the encoded image data 21.

The source device 12 includes the encoder 20, and in addition, may include an image source 16, a pre-processor (or a pre-processing unit) 18, for example, a picture pre-processor, and a communication interface (or a communication unit) 22.

The image source 16 may include or may be any type of image capture device for capturing a real-world image or the like, and/or any type of image generation device, for example, a computer graphics processing unit for generating a computer animated image, or any type of device for obtaining and/or providing a real-world image or a computer generated image (for example, screen content, a virtual reality (virtual reality, VR) image, and/or any combination thereof (for example, an augmented reality (augmented reality, AR) image)). The image source may be any type of memory or storage for storing any one of the foregoing images.

To distinguish processing performed by the pre-processor (or the pre-processing unit) 18, an image (or image data) 17 may also be referred to as a raw image (or raw image data) 17.

The pre-processor 18 is configured to receive the (raw) image data 17 and pre-process the image data 17 to obtain a pre-processed image (or pre-processed image data) 19. For example, the pre-processing performed by the pre-processor 18 may include trimming, color format conversion (for example, conversion from RGB to YCbCr), color correction, or denoising. It can be understood that the pre-processing unit 18 may be an optional component.

The video encoder (or the encoder) 20 is configured to receive the pre-processed image data 19 and provide the encoded image data 21 (this is further described below based on FIG. 3 and the like).

The communication interface 22 of the source device 12 may be configured to receive the encoded image data 21, and send the encoded image data 21 (or any other processed version) to another device, such as the destination device 14, or any other device through a communication channel 13, for storage or direct reconstruction.

The destination device 14 includes the decoder 30, and in addition, may include a communication interface (or a communication unit) 28, a post-processor (or a post-processing unit) 32, and a display device 34.

The communication interface 28 of the destination device 14 is configured to: directly receive the encoded image data 21 (or any other processed version) from the source device 12 or any other source device such as a storage device, for example, a storage device for encoded image data; and provide the encoded image data 21 for the decoder 30.

The communication interface 22 and the communication interface 28 may be configured to send or receive the encoded image data (or encoded data) 21 through a direct communication link, for example, a direct wired or wireless connection, between the source device 12 and the destination device 14, or through any type of network, for example, a wired network, a wireless network, or any combination thereof, or any type of private network or public network or any combination thereof.

For example, the communication interface 22 may be configured to encapsulate the encoded image data 21 into an appropriate format, for example, a packet, and/or process the encoded image data through any type of transmission encoding or processing, so that processed image data can be transmitted through a communication link or a communication network.

The communication interface 28 corresponds to the communication interface 22, and for example, may be configured to receive transmitted data, and process the transmitted data through any type of corresponding transmission decoding or processing and/or decapsulation to obtain the encoded image data 21.

The communication interface 22 and the communication interface 28 each may be configured as a unidirectional communication interface indicated by an arrow, in FIG. 2A, that corresponds to the communication channel 13 and that is directed from the source device 12 to the destination device 14, or a bidirectional communication interface, and may be configured to: send and receive a message or the like to establish a connection, and determine and exchange any other information related to a communication link and/or data transmission such as transmission of encoded image data, and the like.

The video decoder (or the decoder) 30 is configured to receive the encoded image data 21, and provide decoded image data (or decoded data) 31 (this is further described below based on FIG. 4 and the like).

The post-processor 32 is configured to post-process the decoded image data (also referred to as reconstructed image data) 31, for example, a decoded image, to obtain post-processed image data 33, for example, a post-processed image. For example, the post-processing performed by the post-processing unit 32 may include color format conversion (for example, conversion from YCbCr to RGB), color correction, trimming, resampling, or any other processing for generating the decoded image data 31 to be displayed by the display device 34 or the like.

The display device 34 is configured to receive the post-processed image data 33, to display an image to a user, a viewer, or the like. The display device 34 may be or include any type of display for displaying a reconstructed image, for example, an integrated or external display or monitor. For example, the display may include a liquid crystal display (LCD), an organic light emitting diode (OLED) display, a plasma display, a projector, a micro-LED display, a liquid crystal on silicon (LCoS) display, a digital light processor (DLP), or any other type of display.

The coding system 10 further includes a training engine 25. The training engine 25 is configured to train the encoder 20 or the decoder 30, and in particular, a neural network (described in detail below) used in the encoder 20 or the decoder 30.

In embodiments of this application, training data may be stored in a database (not shown), and the training engine 25 performs training based on the training data to obtain the neural network. It should be noted that a source of the training data is not limited in embodiments of this application. For example, the training data may be obtained from a cloud or another place for model training.

Although FIG. 2A shows the source device 12 and the destination device 14 as separate devices, device embodiments may alternatively include both the source device 12 and the destination device 14, or may include functions of both the source device 12 and the destination device 14, that is, may include both the source device 12 or a corresponding function and the destination device 14 or a corresponding function. In these embodiments, the source device 12 or the corresponding function and the destination device 14 or the corresponding function may be implemented by using same hardware and/or software, separate hardware and/or software, or any combination thereof.

Based on the descriptions, existence and (accurate) division of different units or functions in the source device 12 and/or the destination device 14 shown in FIG. 2A may vary based on actual devices and applications. This is clear to a person skilled in the art.

Figure 2B:
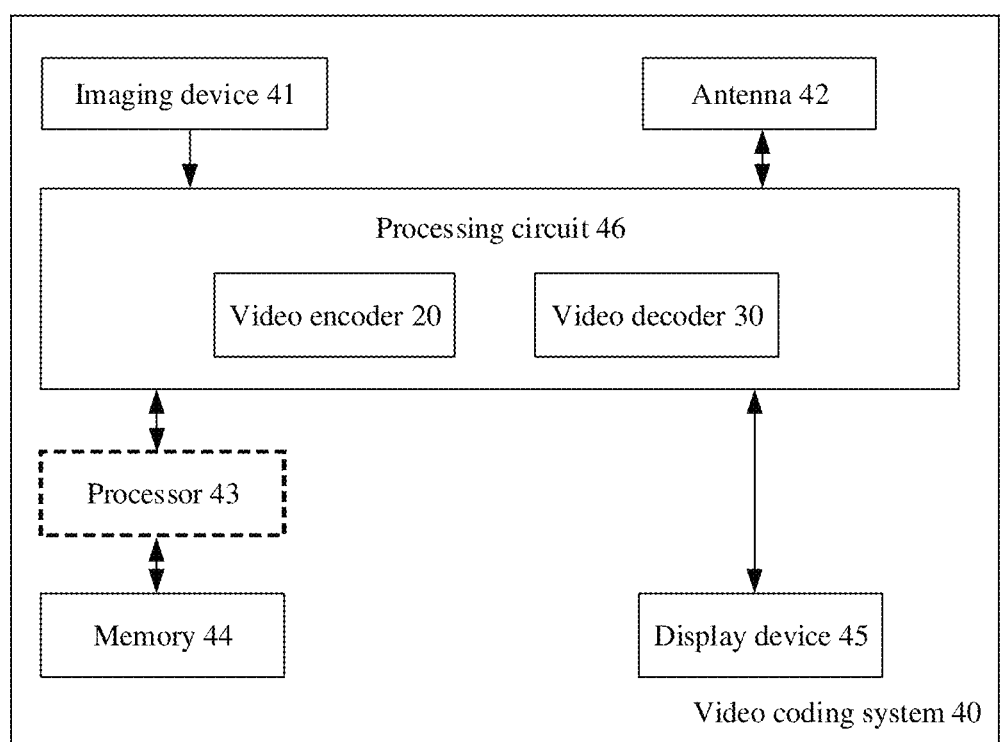
FIG. 2B is a diagram of an example video coding system 40.

The encoder 20 (for example, the video encoder 20), the decoder 30 (for example, the video decoder 30), or both the encoder 20 and the decoder 30 may be implemented by using a processing circuit shown in FIG. 2B, for example, one or more microprocessors, a digital signal processor (DSP), an application-specific integrated circuit (ASIC), a field programmable gate array (FPGA), discrete logic, hardware, a dedicated processor for video encoding, or any combination thereof. The encoder 20 and the decoder 30 each may be implemented by using a processing circuit 46. The processing circuit 46 may be configured to perform various operations described below. If some technologies are implemented in software, a device may store software instructions in a suitable non-transitory computer-readable storage medium, and execute the instructions in hardware through one or more processors, to perform technologies of this application. One of the encoder 20 and the decoder 30 may be integrated in a single device as a part of a combined encoder/decoder (CODEC), as shown in FIG. 2B.

The source device 12 and the destination device 14 may include any one of a variety of devices, including any type of handheld device or stationary device, for example, a notebook computer, a laptop computer, a smartphone, a tablet or tablet computer, a camera, a desktop computer, a set-top box, a television, a display device, a digital media player, a video gaming console, or a video streaming device (for example, a content service server or a content delivery server), and may not use an operating system or may use any type of operating system. In some cases, the source device 12 and the destination device 14 may be equipped with components for wireless communication. Therefore, the source device 12 and the destination device 14 may be wireless communication devices.

In some cases, the coding system 10 shown in FIG. 2A is merely an example. Technologies provided in this application are applicable to a video coding (for example, video encoding or video decoding) device. These devices do not necessarily include any data communication between an encoding device and a decoding device. In another example, data is retrieved from a local memory and is sent through a network. A video encoding device may encode data and store data to a memory, and/or a video decoding device may retrieve the data from the memory and decode the data. In some examples, encoding and decoding are performed by devices that do not communicate with each other but only encode data to a memory and/or retrieve data from a memory and decode the data.

FIG. 2B is a diagram of an example video coding system 40. The video coding system 40 may include an imaging device 41, a video encoder 20, a video decoder 30 (and/or a video encoder or decoder implemented by using a processing circuit 46), an antenna 42, one or more processors 43, one or more memories 44, and/or a display device 45.

As shown in FIG. 2B, the imaging device 41, the antenna 42, the processing circuit 46, the video encoder 20, the video decoder 30, the processor 43, the memory 44, and/or the display device 45 can communicate with each other. In different examples, the video coding system 40 may include only the video encoder 20 or only the video decoder 30.

In some examples, the antenna 42 may be configured to transmit or receive an encoded bitstream of video data. In addition, in some examples, the display device 45 may be configured to display video data. The processing circuit 46 may include ASIClogic, a graphics processing unit, a general-purpose processor, or the like. The video coding system 40 may also include an optional processor 43. Similarly, the optional processor 43 may include ASIC logic, a graphics processing unit, a general-purpose processor, or the like. In addition, the memory 44 may be any type of memory, for example, a volatile memory (for example, a static random access memory (SRAM) or a dynamic random access memory (DRAM)), or a non-volatile memory (for example, a flash memory). In a non-limitative example, the memory 44 may be implemented by using a cache memory. In another example, the processing circuit 46 may include a memory (for example, a cache) for implementing an image buffer.

In some examples, the video encoder 20 implemented by using a logic circuit may include an image buffer (which is implemented by using, for example, the processing circuit 46 or the memory 44) and a graphics processing unit (which is implemented by using, for example, the processing circuit 46). The graphics processing unit may be communicatively coupled to the image buffer. The graphics processing unit may include the video encoder 20 implemented by using the processing circuit 46. The logic circuit may be configured to perform various operations described in this specification.

In some examples, the video decoder 30 may be implemented by using the processing circuit 46 in a similar manner, to implement various modules that are described with reference to the video decoder 30 in FIG. 4 and/or any other decoder system or subsystem described in this specification. In some examples, the video decoder 30 implemented by using a logic circuit may include an image buffer (which is implemented by using the processing circuit 46 or the memory 44) and a graphics processing unit (which is implemented by using, for example, the processing circuit 46). The graphics processing unit may be communicatively coupled to the image buffer. The graphics processing unit may include the video decoder 30 implemented by using the processing circuit 46.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to encoding segmentation (for example, a transform coefficient or a quantized transform coefficient, an optional indicator (as described), and/or data defining the encoding segmentation). The video coding system 40 may further include the video decoder 30 that is coupled to the antenna 42 and that is configured to decode the encoded bitstream. The display device 45 is configured to display a video frame.

It should be understood that, in this embodiment of this application, in an example described with reference to the video encoder 20, the video decoder 30 may be configured to perform a reverse process. For a signaling syntax element, the video decoder 30 may be configured to receive and parse such a syntax element and correspondingly decode related video data. In some examples, the video encoder 20 may entropy-encode the syntax element into an encoded video bitstream. In such examples, the video decoder 30 may parse such a syntax element and correspondingly decode related video data.

For ease of description, embodiments of the present invention are described with reference to versatile video coding (VVC) reference software or high-efficiency video coding (HEVC) that is developed by the joint collaboration team on video coding (JCT-VC) of the ITU-T video coding experts group (VCEG) and ISO/IEC motion picture experts group (MPEG). A person of ordinary skill in the art understands that embodiments of the present invention are not limited to HEVC or VVC.

Figure 3:
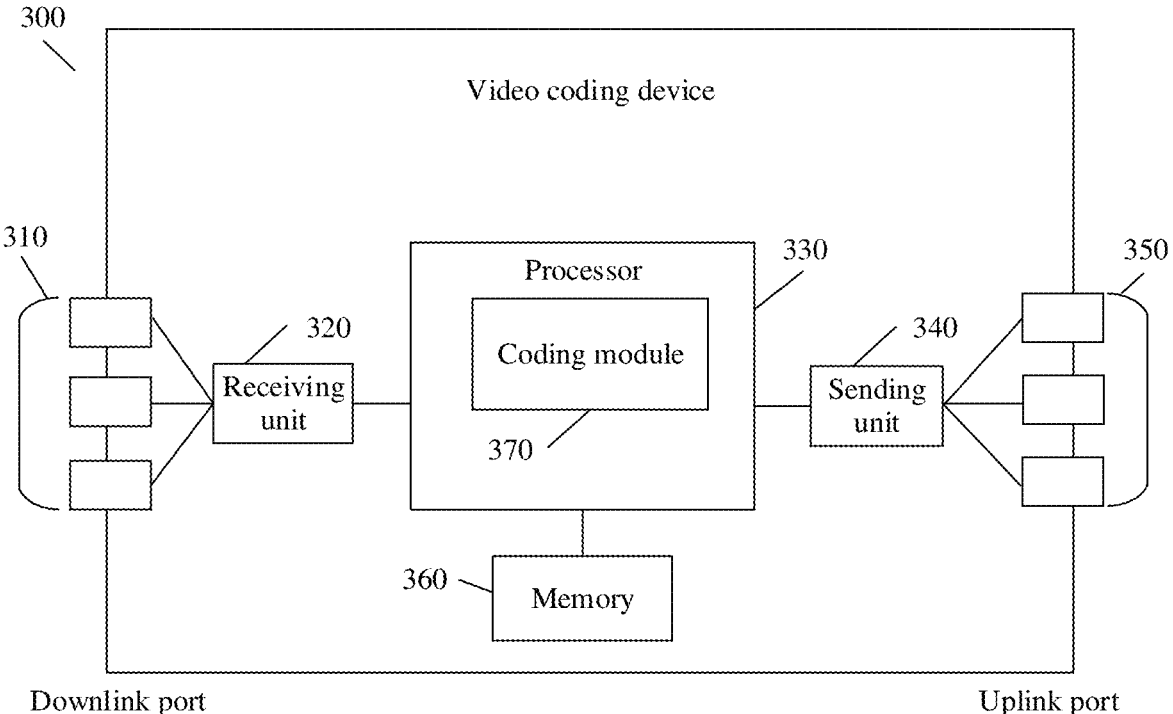
FIG. 3 is a diagram of a video coding device 300 according to an embodiment of the present invention.

FIG. 3 is a diagram of a video coding device 300 according to an embodiment of the present invention. The video coding device 300 is suitable for implementing disclosed embodiments described in this specification. In an embodiment, the video coding device 300 may be a decoder, for example, the video decoder 30 in FIG. 2A, or may be an encoder, for example, the video encoder 20 in FIG. 2A.

The video coding device 300 includes: an ingress port 310 (or an input port 310) and a receiver unit (Rx) 320 configured to receive data; a processor, a logic unit, or a central processing unit (CPU) 330 configured to process data; a transmitter unit (Tx) 340 and an egress port 350 (or an output port 350) configured to transmit data; and a memory 360 configured to store data. For example, the processor 330 may be a neural-network processing unit 330. The video coding device 300 may further include an optical-to-electrical (OE) component and an electrical-to-optical (EO) component that are coupled to the ingress port 310, the receiver unit 320, the transmitter unit 340, and the egress port 350 and that serve as an egress or an ingress for an optical signal or an electrical signal.

The processor 330 is implemented by using hardware and software. The processor 330 may be implemented as one or more processor chips, a core (for example, a multi-core processor), an FPGA, an ASIC, or a DSP. The processor 330 communicates with the ingress port 310, the receiver unit 320, the transmitter unit 340, the egress port 350, and the memory 360. The processor 330 includes a coding module 370 (for example, a neural network NN-based coding module 370). The coding module 370 implements the embodiments disclosed above. For example, the coding module 370 performs, processes, prepares, or provides various encoding operations. Therefore, the coding module 370 provides a substantial improvement on functions of the video coding device 300, and affects switching of the video coding device 300 between different states. Alternatively, the coding module 370 is implemented by using instructions that are stored in the memory 360 and that are to be executed by the processor 330.

The memory 360 includes one or more magnetic disks, a magnetic tape, and a solid-state drive, and may serve as an overflow data storage device to store a program when the program is selected for execution and store instructions and data that are read during execution of the program. The memory 360 may be volatile and/or non-volatile, and may be a read-only memory (ROM), a random access memory (RAM), a ternary content-addressable memory (TCAM), and/or a static random access memory (SRAM).

Figures 4, 5:
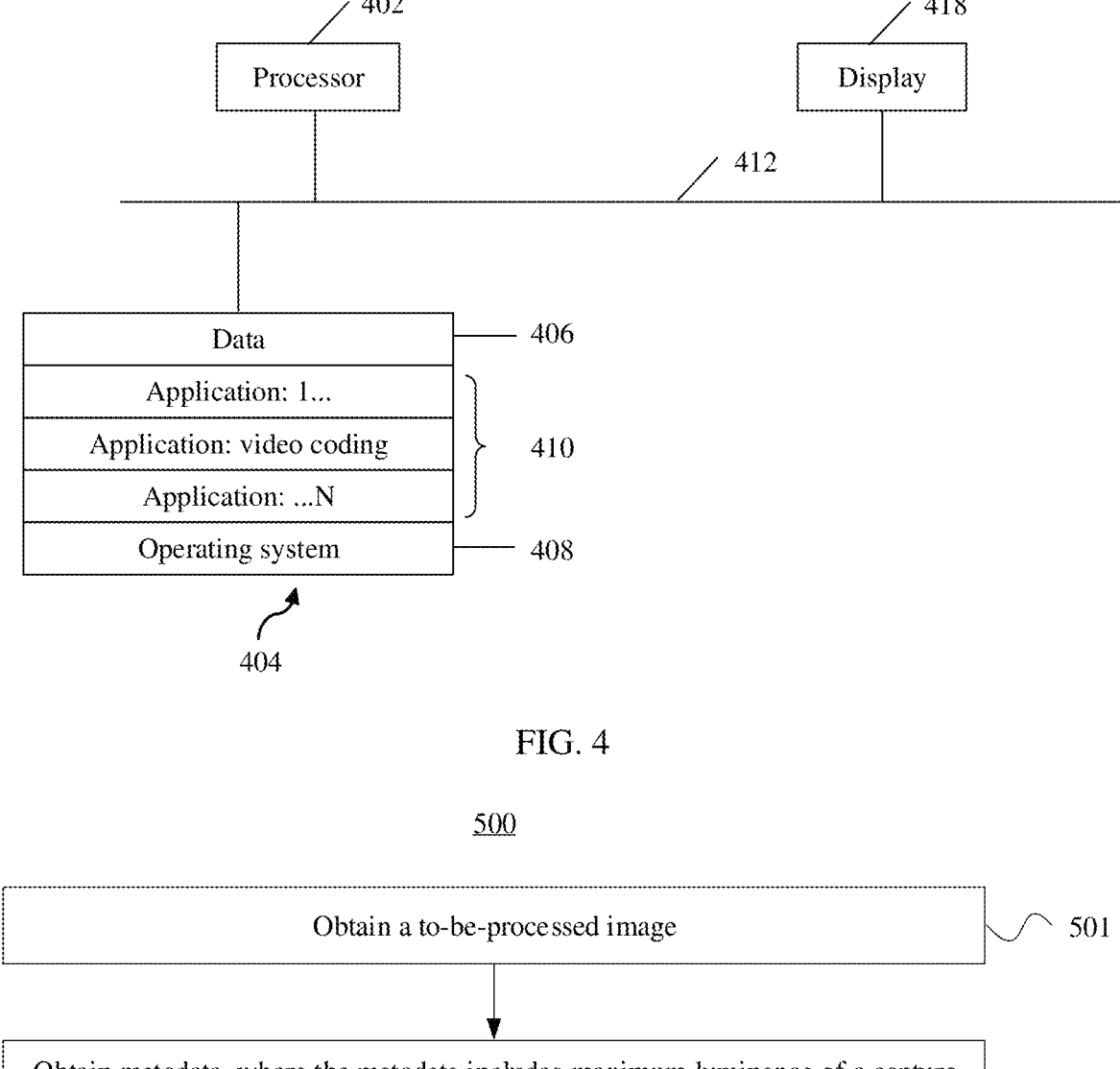
FIG. 4 is a simplified block diagram of an apparatus 400 according to an example embodiment.
FIG. 5 is a flowchart of a process 500 of an image encoding method according to an embodiment of this application.

FIG. 4 is a simplified block diagram of an apparatus 400 according to an example embodiment. The apparatus 400 may serve as either or both of the source device 12 and the destination device 14 in FIG. 2A.

A processor 402 in the apparatus 400 may be a central processing unit. Alternatively, the processor 402 may be any other type of device or a plurality of devices that currently exist or are to be developed in the future and that are capable of manipulating or processing information. Although disclosed implementations may be implemented by a single processor, for example, the processor 402 shown in the figure, a higher speed and higher efficiency are achieved when more than one processor is used.

In an implementation, a memory 404 in the apparatus 400 may be a read-only memory (ROM) device or a random access memory (RAM) device. Any other suitable type of storage device may serve as the memory 404. The memory 404 may include code and data 406 that are accessed by the processor 402 through a bus 412. The memory 404 may further include an operating system 408 and an application 410. The application 410 includes at least one program that enables the processor 402 to perform a method described in this specification. For example, the application 410 may include applications 1 to N, and further include a video coding application for performing the method described in this specification.

The apparatus 400 may further include one or more output devices, for example, a display 418. In an example, the display 418 may be a touch-sensitive display obtained by combining a display with a touch-sensitive element capable of sensing a touch input. The display 418 may be coupled to the processor 402 through the bus 412.

Although the bus 412 in the apparatus 400 is described as a single bus in this specification, the bus 412 may include a plurality of buses. In addition, an auxiliary memory may be directly coupled to another component of the apparatus 400 or may be accessed through a network, and may include a single integrated unit such as a memory card, or a plurality of units such as a plurality of memory cards. Therefore, the apparatus 400 may have a variety of configurations.

Based on the foregoing system, the following describes in detail a method provided in embodiments of this application.

FIG. 5 is a flowchart of a process 500 of an image encoding method according to an embodiment of this application. The process 500 may be performed by the foregoing capture-side electronic device (namely, the video encoder 20). The process 500 is described as a series of operations. It should be understood that the process 500 may be performed in various sequences and/or simultaneously, and is not limited to an execution sequence shown in FIG. 5. The process 500 may include the following operations.

Operation 501: Obtain a to-be-processed image.

Figure 6:
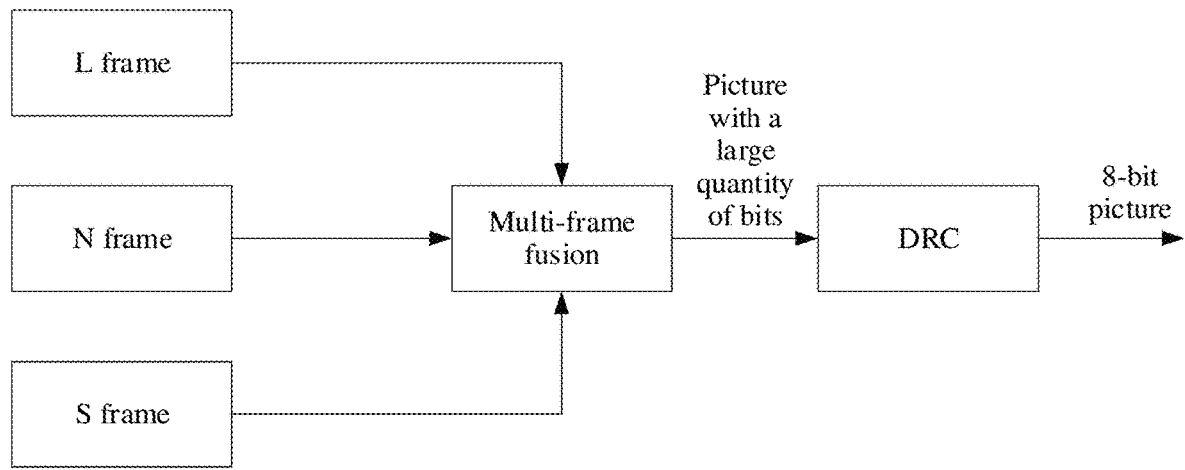
FIG. 6 is a diagram of multi-frame image fusion.

FIG. 6 is a diagram of multi-frame image fusion. As shown in FIG. 6, a capture side uses any capture device, for example, a camera, to capture, for a same scene, a plurality of frames of pictures under different exposure conditions, for example, a long-exposure picture (L (long) frame), a normal-exposure picture (N (normal) frame), and a short-exposure picture (S (short) frame). Exposure time of the L frame is long. Therefore, a quite dark region in the scene can also be clearly photographed, but a bright region is overexposed. The N frame is a normal-exposure frame. A region with medium luminance in the scene is quite good, but a quite bright region is overexposed, and a quite dark region is unclear. Exposure time of the S frame is short. Therefore, a quite bright region in the scene is not overexposed, but a region with medium luminance and a dark region are dark and unclear. Multi-frame fusion is performed on the plurality of frames of pictures (the L frame, the N frame, and the S frame) to generate a picture with a large quantity of bits (bit). The picture with a large quantity of bits integrates the L frame, the N frame, and the S frame. This can leverage advantages of the plurality of frames and eliminate disadvantages of the plurality of frames. For example, a quite bright region in the scene is not overexposed, a region with medium luminance is quite good, and a quite dark region is also quite clear. Then dynamic range compression (DRC) and other processing are performed on the picture with a large quantity of bits to obtain an 8-bit fusion picture.

In this embodiment of this application, the 8-bit fusion picture is the to-be-processed image.

Operation 502: Obtain metadata, where the metadata includes maximum luminance of a capture scene.

During DRC processing on the picture, the capture side may obtain metadata information, such as a dynamic range, maximum luminance, and minimum luminance, of the capture scene. The capture scene is a scene in which the capture side captures the to-be-processed image (a raw image). For example, the capture scene is outdoor at noon, outdoor after dark, outdoor on a cloudy day, or indoor with light.

In an embodiment, the capture side may obtain the metadata based on the L frame, the N frame, and the S frame.

As described above, the L frame, the N frame, and the S frame are fused, so that luminance of a high-luminance region is not lost, and a quite dark region is visible. It can be learned that high dynamic range-related information can be obtained through the multi-frame fusion, and then the metadata is generated.

In an embodiment, the capture side may obtain the metadata through calculation based on a preset photographing parameter.

For example, the capture side selects a reference. For example, maximum luminance of a real capture scene is baseLum (luminance corresponding to 255). Luminance corresponding to each pixel value in the to-be-processed image is marked and stored as lumLUT [256]. To be specific, luminance of the real scene is in a one-to-one correspondence with an image pixel value. The image pixel value ranges from 0 to 255, and there are a total of 256 values. The selected reference makes each pixel value be in a one-to-one correspondence with a real luminance value of the scene. An image grayscale of a pixel is marked by minval. Corresponding sensitivity (ISO) is baseISO, and exposure time is baseExp. During photographing, ISO of the N frame is curISO, exposure time of the N frame is curExp, and a gain corresponding to electron volt (electron volt, EV) dropping of the S frame is Dgain. To be specific, the S frame is implemented through EV dropping. An EV has different values, and different sizes correspond to different Dgains. If there is no S frame, Dgain is 1. In this case, the maximum luminance maxLumScene and the minimum luminance minLumScene of the capture scene may be calculated by using the following method.

$$maxLumScene = (baseISO/curISO)^{Dgain} \times (curExp/baseExp) \times baseLum$$

$$minLumScene = (baseISO/curISO)^{Dgain} \times (curExp/baseExp \times$$
$$lumLUT[minval]$$

It should be noted that, in this embodiment of this application, the maximum luminance and the minimum luminance of the capture scene may alternatively be obtained by using another method. This is not limited herein.

Operation 503: Encode the to-be-processed image and the metadata to obtain a first bitstream.

After obtaining the to-be-processed image and the metadata, the capture side may encode the to-be-processed image and the metadata to obtain the first bitstream. An encoding scheme used by the capture side to encode the to-be-processed image may include a standard hybrid video encoding technology, an end-to-end encoding network, a machine learning model-based encoding technology, or the like. The encoding scheme for the to-be-processed image is not limited in this embodiment of this application. The metadata may be encoded into a reserved field of a bitstream, for example, an appn field in JPG. In addition, the capture side may alternatively encode the metadata by using another method. This is not limited herein.

Figure 7:
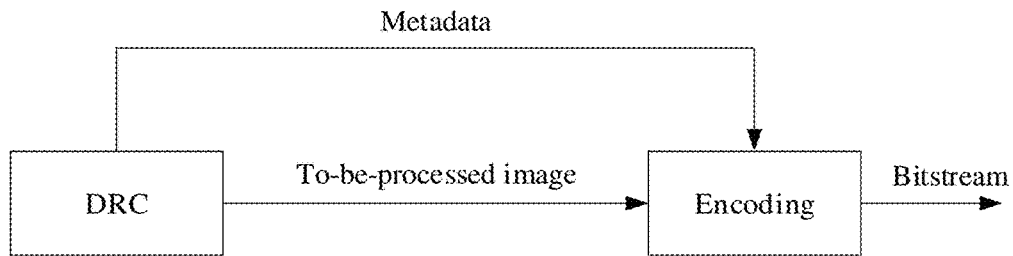
FIG. 7 is a diagram of an encoding process on a capture side.

FIG. 7 is a diagram of an encoding process on the capture side. As shown in FIG. 7, the capture side may obtain metadata by using the method in operation 502 during DRC processing on a picture, and then encode a to-be-processed image and the metadata by using the method in operation 503 to obtain a first bitstream, and then may transmit the first bitstream to a display side.

Figure 8A:
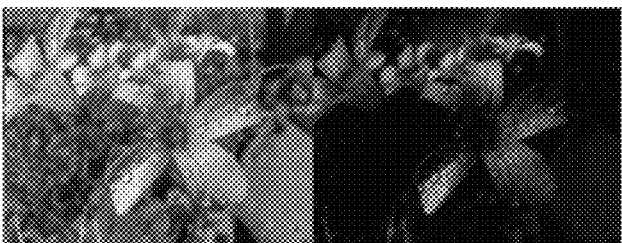
FIG. 8*a* and FIG. 8*b* are diagrams of an hdrLayer.
Figure 8B:
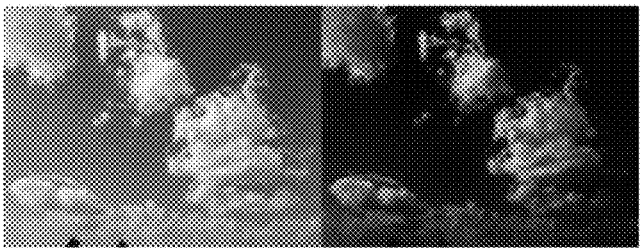

In an embodiment, in this embodiment of this application, a high dynamic range layer (hdrLayer) may be obtained. The hdrLayer may be a two-dimensional single-channel 8-bit image, and is used to mark a high-luminance region in the to-be-processed image. A resolution of the hdrLayer may be equal to a resolution of the to-be-processed image, or the resolution of the hdrLayer may be less than or greater than the resolution of the to-be-processed image. When the resolution of the hdrLayer is less than or greater than the resolution of the to-be-processed image, a display side may perform super-resolution image processing or downsampling on the hdrLayer, to match the to-be-processed image. In this way, required storage space can be reduced. This is not limited in this embodiment of this application. Alternatively, the hdrLayer may be displayed in any data form that can store a plurality of parameters, for example, a two-dimensional array, a three-dimensional array, or an array with other dimensionality. A specific form of the hdrLayer is not limited in this application. FIG. 8a and FIG. 8b are diagrams of the hdrLayer. As shown in FIG. 8a and FIG. 8b, the hdrLayer is a grayscale image, and may mark a high-luminance region in the raw image. A larger value indicates higher luminance of the raw image. Therefore, the hdrLayer is bright for a region with high luminance in the raw image, and the hdrLayer is dark for a region with low luminance in the raw image.

The hdrLayer mainly assists the display side in adjusting image luminance to adapt to perception of human eyes. Therefore, the display side needs to obtain the hdrLayer. The capture side may assist, in the following two embodiments, the display side in obtaining the hdrLayer.

In an embodiment, the capture side generates N×M groups of parameters, where each group of parameters includes k parameters, the N×M groups of parameters correspond to N×M image blocks included in the to-be-processed image, both N and M are positive integers, N×M>1, and k>1; and encodes the N×M groups of parameters to obtain a second bitstream.

The N×M groups of parameters are used for generating an hdrLayer. Therefore, to reduce a bitstream size, the capture side may not directly generate an hdrLayer, but transmit, to the display side, the second bitstream obtained by encoding the N×M groups of parameters for generating an hdrLayer. Then the display side decodes the bitstream to restore N×M groups of parameters, and then generates an hdrLayer based on the N×M groups of parameters. This can improve transmission efficiency.

Figure 9:
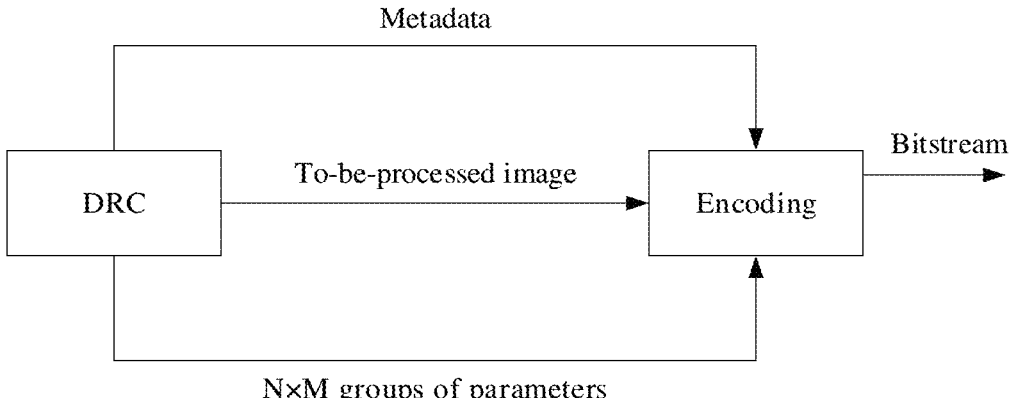
FIG. 9 is a diagram of an encoding process on a capture side.

FIG. 9 is a diagram of an encoding process on the capture side. As shown in FIG. 9, in addition to obtaining the metadata, the capture side may further generate the N×M groups of parameters, and then encode the metadata, the to-be-processed image, and the N×M groups of parameters to obtain the first bitstream and the second bitstream, and may further transmit the first bitstream and the second bitstream to the display side. It should be noted that the first bitstream and the second bitstream may be sequentially concatenated into one bitstream, or may be combined into one bitstream in a preset embodiment, or may be transmitted one by one as separate bitstreams. This is not limited herein.

In another embodiment, the capture side generates N×M groups of parameters, where each group of parameters includes k parameters, the N×M groups of parameters correspond to N×M image blocks included in the to-be-processed image, both N and M are positive integers, N×M>1, and k>1; processes the corresponding image blocks based on the N×M groups of parameters respectively to obtain a high dynamic range layer hdrLayer; and encodes the hdrLayer to obtain a third bitstream.

Alternatively, the capture side may generate an hdrLayer based on N×M groups of parameters, and then transmit, to the display side, a third bitstream obtained by encoding the hdrLayer. Then the display side decodes the bitstream to restore an hdrLayer. This can improve processing efficiency of the display side.

Figure 10:
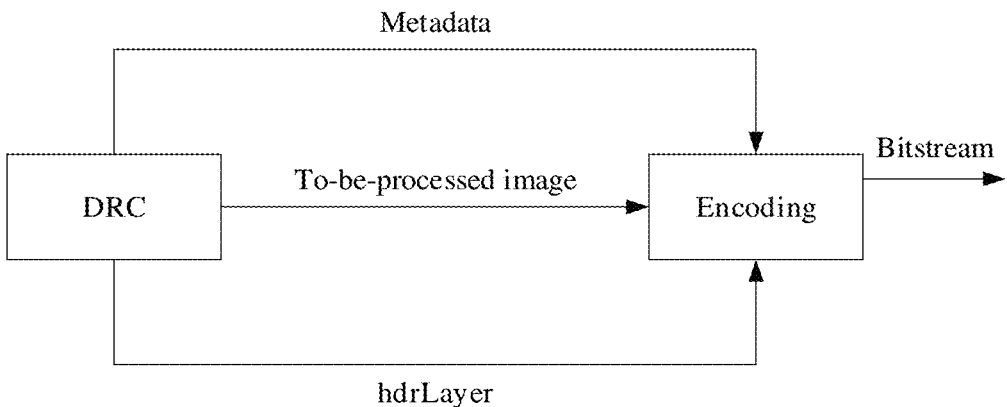
FIG. 10 is a diagram of an encoding process on a capture side.

FIG. 10 is a diagram of an encoding process on the capture side. As shown in FIG. 10, in addition to obtaining the metadata, the capture side may further generate the hdrLayer, and then encode the metadata, the to-be-processed image, and the hdrLayer to obtain the first bitstream and the third bitstream, and may further transmit the first bitstream and the third bitstream to the display side. It should be noted that the first bitstream and the third bitstream may be sequentially concatenated into one bitstream, or may be combined into one bitstream in a preset embodiment, or may be transmitted one by one as separate bitstreams. This is not limited herein.

Alternatively, in addition to the first bitstream, the capture side may transmit both the second bitstream and the third bitstream to the display side. In this case, the first bitstream, the second bitstream, and the third bitstream may be sequentially concatenated into one bitstream, or may be combined into one bitstream in a preset embodiment, or may be transmitted one by one as separate bitstreams. This is not limited herein.

In this embodiment of this application, the N×M groups of parameters may be obtained by using a machine learning model (for the machine learning model, refer to the foregoing descriptions, and details are not described herein again), or the N×M groups of parameters may be obtained based on a histogram of the to-be-processed image.

Figure 11:
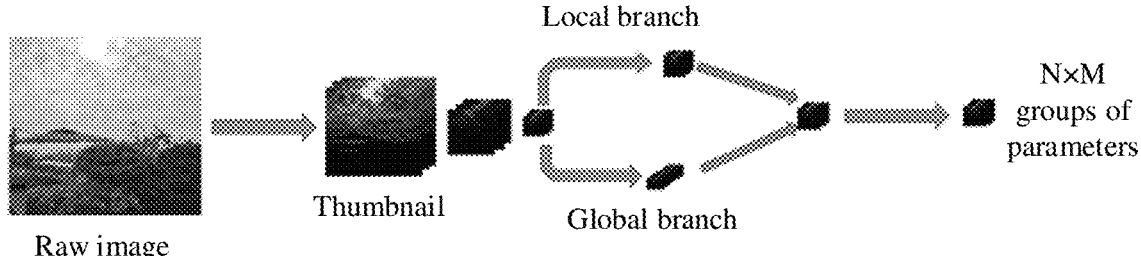
FIG. 11 is a diagram of generating N×M groups of parameters.

For example, FIG. 11 is a diagram of generating the N×M groups of parameters. As shown in FIG. 11, the capture side divides the to-be-processed image (the raw image) into N×M blocks, each block outputs k parameters, and a total of N×M×k parameters may be obtained.

In this embodiment of this application, the raw image may be scaled to a smaller resolution, for example, 256×256. A thumbnail enters the machine learning model (for example, a network), and the N×M×k parameters are obtained through learning by using the network. The network may include a local branch and a global branch. A convolution operation, downsampling, channel quantity increasing, and other processing are performed on the thumbnail. These operations are repeated, for example, are performed four times (downsampling is performed four times). In this case, the resolution becomes 16×16. Then processing is performed in the local branch. The resolution remains at 16×16 in the local branch, but convolution is performed, without downsampling. Processing is performed in the global branch. Downsampling continues to be performed in the global branch until the resolution becomes 1×1. Then an output of the local branch and an output of the global branch are added up (the resolution 16×16 and the resolution 1×1 are added up, where the resolution 1×1 is first changed to the resolution 16×16, for example, through repeated copying). Then convolution is performed, and the resolution becomes 16×16×k. Herein, k may be 9, 17, or the like, and is approximately an nth power of 2 plus 1. Finally, the N×M×k parameters are output.

In addition, generating the hdrLayer based on the N×M groups of parameters is essentially an interpolation process, and values of the N×M×k parameters range from 0 to 1, or may range from 0 to 255. N and M indicate space division, and an image is divided into N×M blocks, k indicates range division, and a range is divided into k−1 segments and k fixed points. However, actually, input values are continuous, and are not exactly k values. Therefore, interpolation needs to be performed in the middle. Interpolation in space is the same. To be specific, two-dimensional interpolation is performed in space domain, and may be referred to as bilinear interpolation, and linear interpolation is performed in a range.

Figure 12:
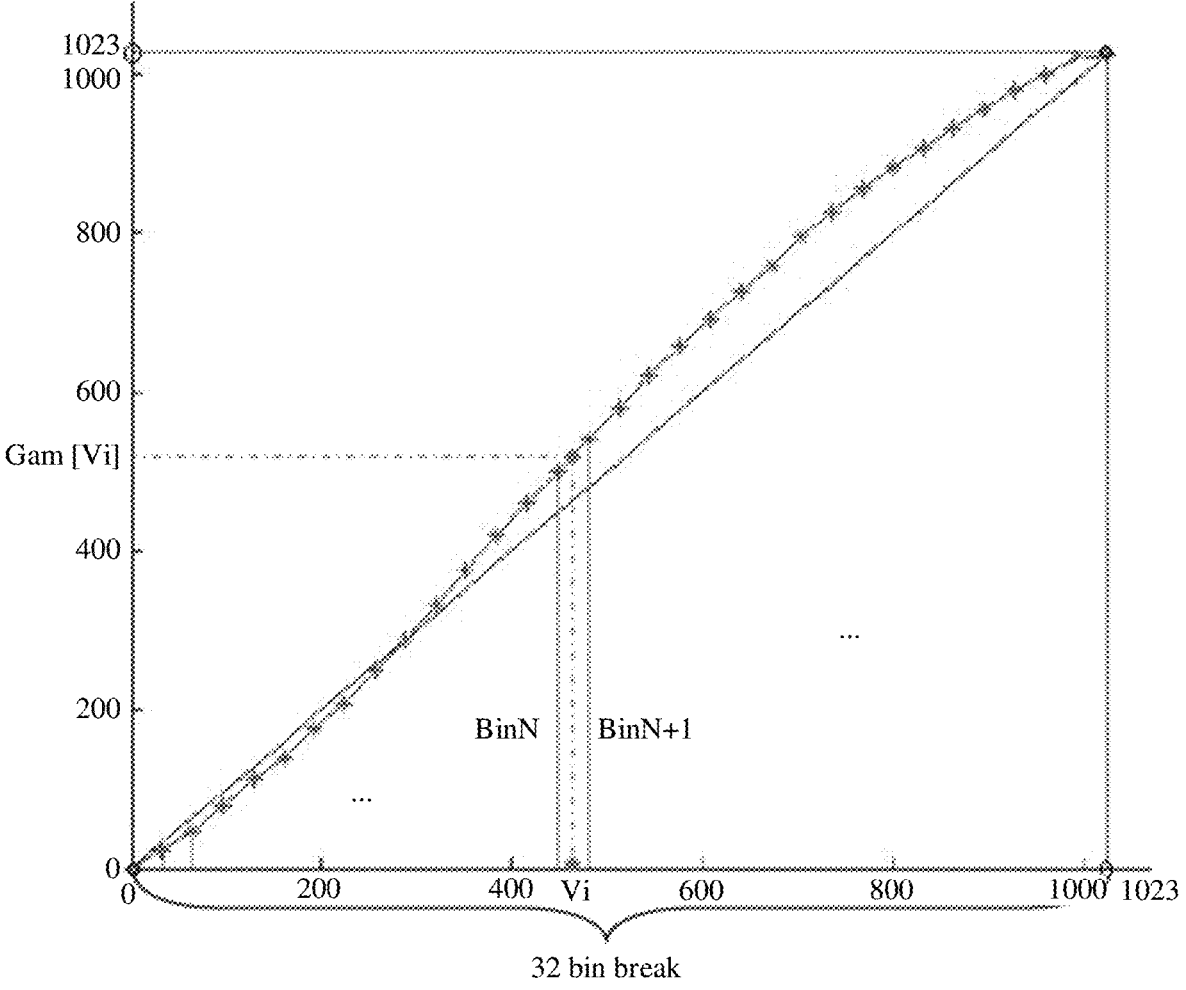
FIG. 12 is a diagram of range interpolation.
Figure 13:
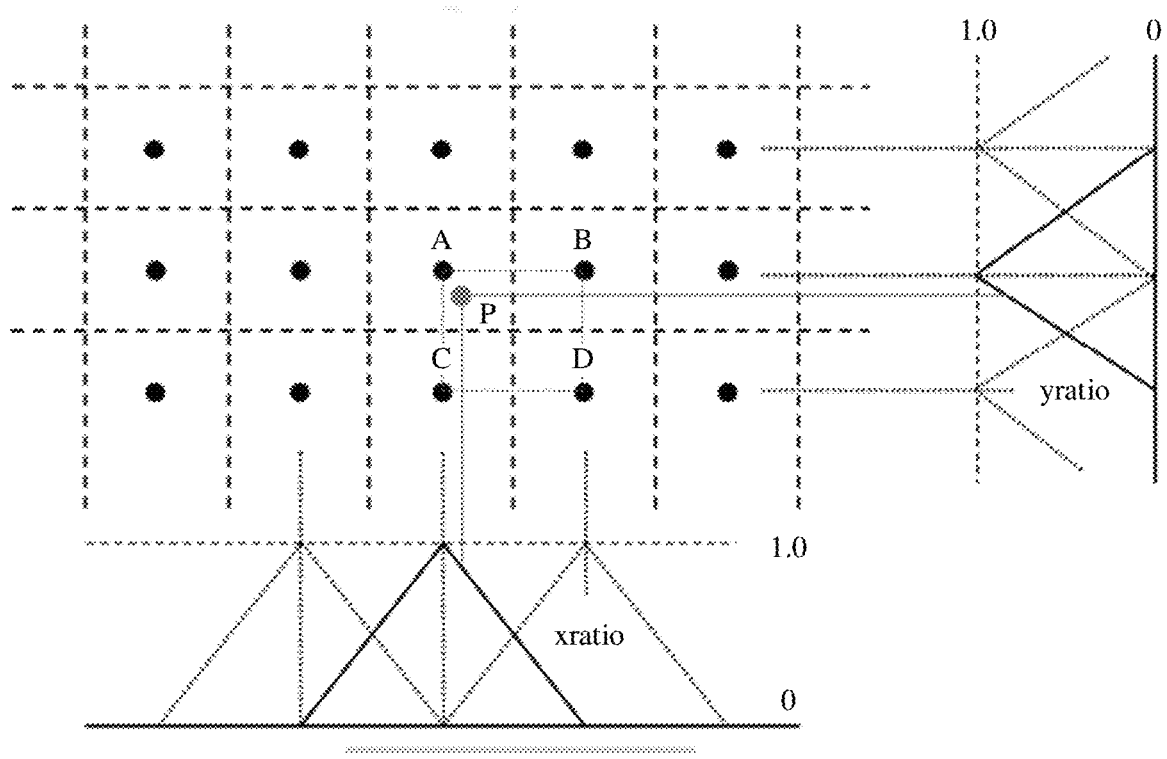
FIG. 13 is a diagram of space-domain interpolation.

For example, there are N×M blocks in space domain. To ensure smoothness between blocks, four adjacent blocks need to be selected for interpolation. With respect to k for a range, luminance Y of an input raw image is continuous, but k is discontinuous. Therefore, interpolation also needs to be performed in the middle. For example, with respect to k for a range, the range is 0-255. When an output is 255, the hdrLayer is bright. When an output is 0, the hdrLayer is dark. The k values are values ranging from 0 to 255. FIG. 12 is a diagram of range interpolation. As shown in FIG. 12, Vi is obtained through interpolation between horizontal coordinates BinN and BinN+1, and then a vertical-axis coordinate Gam [Vi] corresponding to Vi is found from a curve. FIG. 13 is a diagram of space-domain interpolation. As shown in FIG. 13, four adjacent blocks are selected, and a block closer to a point P has a larger weight.

FIG. 14 is a flowchart of a process 1400 of an image display method for an electronic device according to an embodiment of this application. The process 1400 may be performed by the foregoing display-side electronic device (namely, the video decoder 30). A target image may be displayed by a display component. The display component may be a display module integrated in the electronic device, for example, a touchscreen. Alternatively, the display component may be a display independent of the electronic device, for example, an external display connected to the electronic device, or a smart screen or a screen projected by the electronic device. This is not limited herein. The process 1400 is described as a series of operations. It should be understood that the process 1400 may be performed in various sequences and/or simultaneously, and is not limited to an execution sequence shown in FIG. 14. The process 1400 may include the following operations.

Operation 1401: Obtain a to-be-processed image.

A display side receives a bitstream from a capture side, and decodes the bitstream to obtain the to-be-processed image. The foregoing hybrid decoding scheme, an end-to-end decoding scheme, a machine learning model-based decoding scheme, or the like may be used. A decoding scheme for the to-be-processed image is not limited in this embodiment of this application.

Operation 1402: Obtain high-luminance enhancement data, where the high-luminance enhancement data includes an hdrLayer.

The display side may obtain a high dynamic range layer (hdrLayer). The hdrLayer may be a two-dimensional single-channel 8-bit image, and is used to mark a high-luminance region in the to-be-processed image. A resolution of the hdrLayer may be equal to a resolution of the to-be-processed image, or the resolution of the hdrLayer may be less than the resolution of the to-be-processed image. This is not limited herein.

The hdrLayer mainly assists the display side in adjusting image luminance to adapt to perception of human eyes. Therefore, the display side may obtain the hdrLayer in the following three embodiments.

In an embodiment, a bitstream is received, and the bitstream is decoded to obtain the hdrLayer.

In an embodiment corresponding to the embodiment used by the capture side in the embodiment shown in FIG. 9, the capture side generates the hdrLayer, encodes the hdrLayer into a bitstream, and transmits the bitstream to the display side. Correspondingly, the display side may receive the bitstream, and decode the bit stream to directly obtain the hdrLayer. In this way, processing efficiency of the display side can be improved.

In another embodiment, a bitstream is received; the bitstream is decoded to obtain N×M groups of parameters, where each group of parameters includes k parameters, and the N×M groups of parameters correspond to N×M image blocks included in the to-be-processed image; and corresponding image blocks are processed based on the N×M groups of parameters respectively to obtain the hdrLayer.

In an embodiment corresponding to the embodiment used by the capture side in the embodiment shown in FIG. 8, the capture side generates the N×M groups of parameters, encodes the N×M groups of parameters into a bitstream, and transmits the bitstream to the display side. Correspondingly, the display side may receive the bitstream, decode the bitstream to first obtain the N×M groups of parameters, and then obtain the hdrLayer based on the N×M groups of parameters. This can reduce a bitstream size and improve transmission efficiency.

In still another embodiment, N×M groups of parameters are generated, where each group of parameters includes k parameters, and the N×M groups of parameters correspond to N×M image blocks included in the to-be-processed image; and corresponding image blocks are processed based on the N×M groups of parameters respectively to obtain the hdrLayer.

In this embodiment of this application, the capture side may not perform processing on the hdrLayer, to be specific, does not need to generate the hdrLayer or generate the N×M groups of parameters. The display side alone generates the N×M groups of parameters based on the to-be-processed image, and then obtains the hdrLayer. This can reduce a bitstream size and improve transmission efficiency.

The display side may obtain k parameters for each of the N×M image blocks included in the to-be-processed image, to obtain the N×M groups of parameters. The k parameters of each image block may be expressed as a one-dimensional table. The N×M groups of parameters are applied to the to-be-processed image to obtain a final hdrLayer. For this process, refer to the foregoing descriptions. Details are not described herein again.

The N×M groups of parameters are obtained by using a machine learning model, or the N×M groups of parameters are obtained based on a histogram of the to-be-processed image. Refer to the foregoing descriptions. Details are not described herein again.

It should be noted that, in this embodiment of this application, the hdrLayer may alternatively be obtained in another embodiment. This is not limited herein.

In an embodiment, the high-luminance enhancement data further includes metadata. The metadata may include a dynamic range, maximum luminance, minimum luminance, or the like of a capture scene. The display side may obtain the metadata in the following two embodiments.

In a method, a bitstream is received, and the bitstream is decoded to obtain the metadata.

In this embodiment of this application, after obtaining the metadata, the capture side may encode the metadata and the to-be-processed image to obtain a bitstream, and then transmit the bitstream to the display side. Correspondingly, the display side may receive and decode the bitstream to directly obtain the metadata.

In another method, a bitstream is received, the bitstream is decoded to obtain a photographing parameter of the capture scene, and the metadata is obtained through calculation based on the photographing parameter.

In this embodiment of this application, the capture side may encode, into a bitstream, a photographing parameter of the capture scene that is required for obtaining the metadata, and transmit the bitstream to the display side. In this way, the display side receives and decodes the bitstream to obtain the photographing parameter of the capture scene, and then obtains the metadata based on the photographing parameter.

For example, the photographing parameter of the capture scene may include maximum luminance baseLum (luminance corresponding to 255) of a real capture scene. Luminance corresponding to each pixel value in the to-be-processed image is marked and stored as lumLUT [256]. To be specific, luminance of the real scene is in a one-to-one correspondence with an image pixel value. The image pixel value ranges from 0 to 255, and there are a total of 256 values. The selected reference makes each pixel value be in a one-to-one correspondence with a real luminance value of the scene. An image grayscale of a pixel is marked by minval. Corresponding sensitivity (ISO) is baseISO, and exposure time is baseExp. During photographing, ISO of an N frame is curISO, exposure time of the N frame is curExp, and a gain corresponding to electron volt (EV) dropping of an S frame is Dgain. To be specific, the S frame is implemented through EV dropping. An EV has different values, and different sizes correspond to different Dgains. If there is no S frame, Dgain is 1. Therefore, the display side may calculate the maximum luminance maxLumScene and the minimum measure minLumScene of the capture scene by using the following method.

$$maxLumScene = \left(baseISO/curISO\right)^{Dgain} \times \left(curExp/baseExp\right) \times baseLum$$

$$minLumScene = \left(baseISO/curISO\right)^{Dgain} \times \left(curExp/baseExp \times\right.$$
$$\left. lumLUT[minval]\right]$$

It should be noted that, in this embodiment of this application, the maximum luminance and the minimum luminance of the capture scene may alternatively be obtained by using another method. This is not limited herein.

Operation 1403: Obtain initial backlight luminance of the electronic device.

The electronic device has a backlight technology. Therefore, the initial backlight luminance of the electronic device may be set based on a surrounding environment. Refer to a related backlight technology. Details are not described herein.

Operation 1404: Obtain target backlight luminance of the electronic device based on the initial backlight luminance.

To achieve good visual experience, the display side may adjust backlight of the electronic device based on luminance information related to the capture scene (for example, the dynamic range, the maximum luminance, or the minimum luminance of the capture scene) in the metadata, including increasing backlight luminance or decreasing backlight luminance. Compared with a conventional technology in which backlight luminance is decreased due to screen power consumption, in this solution, backlight luminance can be increased to fully utilize a high dynamic range (HDR) of a screen of the electronic device. Therefore, the target backlight luminance of the electronic device is greater than the initial backlight luminance of the electronic device.

For example, the display side may obtain the target backlight luminance of the electronic device by using the following two methods.

In a method, the initial backlight luminance is processed based on a preset backlight adjustment ratio to obtain the target backlight luminance.

The display side may preset a ratio, for example, a backlight increase ratio (used to increase backlight luminance, where the target backlight luminance is greater than the initial backlight luminance) or a backlight decrease ratio (used to decrease backlight luminance, where the target backlight luminance is less than the initial backlight luminance), based on a historical record, big data analysis, a screen attribute of the electronic device, or the like. The display side may process the initial backlight luminance based on the preset backlight adjustment ratio, for example, multiply the initial backlight luminance by the preset backlight adjustment ratio to obtain the target backlight luminance.

It should be noted that the method described above does not constitute a limitation. An embodiment of setting the preset backlight adjustment ratio and an embodiment of obtaining the target backlight luminance are not limited in this embodiment of this application.

In another method, a backlight adjustment ratio is obtained based on the metadata, and the initial backlight luminance is processed based on the backlight adjustment ratio to obtain the target backlight luminance.

A difference from the foregoing method lies in that the backlight adjustment ratio is not preset, and may be calculated by the display side. The backlight adjustment ratio may alternatively be a backlight increase ratio (used to increase backlight luminance, where the target backlight luminance is greater than the initial backlight luminance) or a backlight decrease ratio (used to decrease backlight luminance, where the target backlight luminance is less than the initial backlight luminance).

In this embodiment of this application, the display side may obtain a first ratio based on the maximum luminance of the capture scene, where the first ratio is a ratio of luminance perception of human eyes in the capture scene to white diffuse reflection perception; obtain a second ratio based on the first ratio, where the second ratio is a ratio of luminance perception of human eyes on the display side to white diffuse reflection perception, and the second ratio is less than or equal to the first ratio; and obtain the backlight adjustment ratio based on the second ratio.

Under different white diffuse reflection, luminance perception of human eyes usually meets a power function. As shown in FIG. 15, per=lum $1/\gamma$, and $$\gamma = 2.3 - \frac{\log\left(\frac{lum}{50}\right)}{10}.$$

Usually, luminance perception of human eyes on the display side is weaker than luminance perception of human eyes on the capture side. Under same white diffuse reflection, the following may be obtained: P2=a×P1, where a indicates a preset coefficient, and a≤1. However, in an ideal state, luminance perception of human eyes on the display side is the same as luminance perception of human eyes on the capture side. Under same white diffuse reflection, the following may be obtained: P1=P2.

The following may be obtained through substitution into the foregoing power function:

$$P1 = L1^{1/\gamma s}$$

$$L1 = \frac{Lmax}{2 \times pi},$$

where Lmax indicates the maximum luminance of the capture scene; and $$\gamma s = 2.3 - \frac{\log\left(\frac{L1}{50}\right)}{10}.$$

$$P2 = (gainBL \times L2)^{1/\gamma d}$$

gainBL indicates the backlight adjustment ratio;

$$L2 = \frac{AmbientLum}{2 \times pi},$$

where AmbientLum indicates intensity of ambient light; and $$\gamma s = 2.3 - \frac{\log\left(\frac{L2}{50}\right)}{10}.$$

The backlight adjustment ratio may be obtained based on an equation relationship between P1 and P2:

$$gainBL = \frac{\left(a \times \left(L1^{1/\gamma s}\right)\right)^{\gamma d}}{L2}$$

In an ideal state, a=1.

The display side may process the initial backlight luminance based on the backlight adjustment ratio, for example, multiply the initial backlight luminance by the backlight adjustment ratio to obtain the target backlight luminance.

It should be noted that, in this embodiment of this application, the backlight adjustment ratio may alternatively be obtained by using another method. This is not limited herein.

Operation 1405: Perform luminance adjustment on the to-be-processed image based on the hdrLayer to obtain a target image suitable for the target backlight luminance.

In the foregoing operations, to achieve an ideal state in which luminance perception of human eyes on the display side is approximately the same as luminance perception of human eyes on the capture side, the target backlight luminance of the electronic device is calculated, and backlight luminance of the electronic device is adjusted to the target backlight luminance, so that display effect for the to-be-processed image on the display side adapts to luminance perception of human eyes in a real capture scene. However, some HDR regions in the to-be-processed image may be distorted after the backlight adjustment. For example, when the target backlight luminance is greater than the initial backlight luminance, backlight luminance of the electronic device is increased. In this case, the HDR region in the to-be-processed image may be dazzling.

To ensure that luminance perception of human eyes on the display side is approximately the same as luminance perception of human eyes on the capture side, pixel processing may be performed on the to-be-processed image to adjust pixel values of some regions, so that luminance of the regions is the same as luminance used before the backlight adjustment, to avoid irritation to eyes.

In this embodiment of this application, pixel values of some regions may be adjusted by using the following method: The display side obtains a target weight based on the hdrLayer. For example, the display side may divide a first pixel value in the hdrLayer by a preset threshold to obtain a first weight value of the first pixel value, where the first pixel value is any pixel value in the hdrLayer, and the target weight includes the first weight value; and then perform luminance adjustment on the to-be-processed image based on the target weight to obtain the target image.

For example, the foregoing process may be expressed as the following formulas:

$$pixelLow = pow(1/gainBL, 1/2.2) \times pixelSrc;$$

$$weight = hdrLayer/255;$$

$$pixelOut = pixelSrc \times weight + pixelLow \times (1 - weight),$$

where pow(1/gainBL, 1/2.2) indicates a pixel adjustment coefficient, pixelSrc indicates any pixel value in the to-be-processed image, pixelLow indicates a pixel value obtained by adjusting the any pixel value, weight indicates the target weight, and pixelOut indicates a target pixel value corresponding to the any pixel value.

All pixels in the to-be-processed image may be processed by using the foregoing method to obtain the target image.

In an embodiment, in this embodiment of this application, the hdrLayer may alternatively be used as a guide picture or a reference picture. A correspondence between a pixel value in the to-be-processed image and a pixel value in the target image is obtained, and then the pixel value in the to-be-processed image is processed based on the correspondence to obtain the target image.

In addition, in this embodiment of this application, pixel values of some regions may alternatively be adjusted by using another method to obtain the target image. This is not limited herein.

In this embodiment of this application, if backlight luminance of the electronic device is increased, some regions of the to-be-processed image may be excessively bright, causing irritation to eyes. Therefore, pixel adjustment may be performed based on the hdrLayer to decrease pixel luminance of the regions and avoid irritation to eyes. If backlight luminance of the electronic device is decreased, some regions of the to-be-processed image may be excessively dark, causing loss of details. Therefore, pixel adjustment may be performed based on the hdrLayer to increase pixel luminance of the regions and avoid loss of details.

Operation 1406: Display the target image at the target backlight luminance.

The target backlight luminance of the electronic device is obtained in operation 1404. Therefore, screen luminance of the electronic device may be adjusted based on a backlight technology of the electronic device, so that the screen luminance reaches the target backlight luminance. Then the target image adjusted in operation 1405 is displayed at the luminance. This can resolve a problem that some regions of the to-be-processed image are excessively bright due to an increase in backlight luminance, causing irritation to eyes. This can also resolve a problem that some regions of the to-be-processed image are excessively dark due to a decrease in backlight luminance, causing loss of details.

Figure 16:
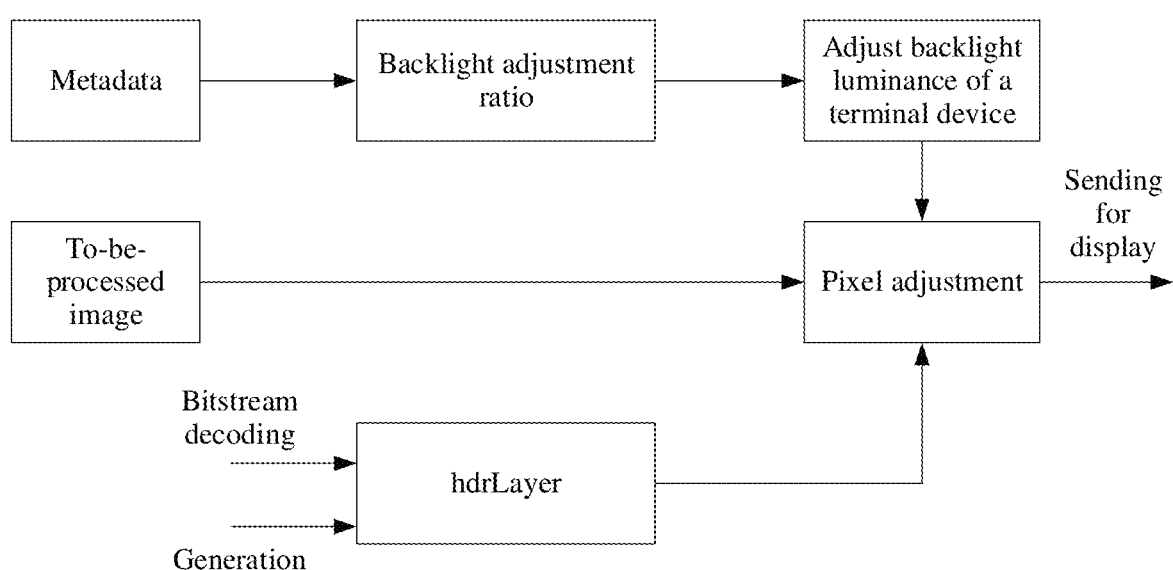
FIG. 16 is a diagram of a processing process on a display side.

FIG. 16 is a diagram of a processing process on the display side. As shown in FIG. 16, the display side obtains a to-be-processed image and metadata by using the method described in the foregoing embodiment, and obtains an hdrLayer by using the three methods in operation 1402. A backlight adjustment ratio is obtained based on the metadata, and then backlight luminance of the electronic device is adjusted. Pixels in the to-be-processed image are adjusted based on the hdrLayer. Two adjustment results are combined to obtain a final target image, and then the target image is sent for display.

In this embodiment of this application, the target backlight luminance of the electronic device is obtained based on the initial backlight luminance of the electronic device, to adjust backlight luminance of the electronic device, and fully utilize a luminance range of a screen for image display. In addition, for a region, in the to-be-processed image, in which distortion occurs due to luminance adjustment, pixel adjustment is performed based on the hdrLayer to obtain the target image suitable for the target backlight luminance, to resolve an image distortion problem. Then the target image is displayed at the target backlight luminance. The target image and the target backlight luminance match each other for display. This achieves optimal end-to-end experience.

Figure 17:
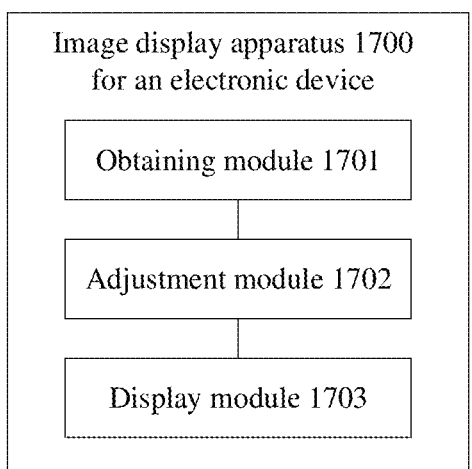
FIG. 17 is a diagram of an example structure of an image display apparatus 1700 according to an embodiment of this application.

FIG. 17 is a diagram of an example structure of an image display apparatus 1700 for an electronic device according to an embodiment of this application. As shown in FIG. 17, the image display apparatus 1700 for an electronic device in this embodiment may be used for a decoder side 30. The image display apparatus 1700 for an electronic device may include an obtaining module 1701, an adjustment module 1702, and a display module 1703.

The obtaining module 1701 is configured to: obtain a to-be-processed image; obtain high-luminance enhancement data, where the high-luminance enhancement data includes a high dynamic range layer hdrLayer; obtain initial backlight luminance of the electronic device; and obtain target backlight luminance of the electronic device based on the initial backlight luminance. The adjustment module 1702 is configured to perform luminance adjustment on the to-be-processed image based on the hdrLayer to obtain a target image suitable for the target backlight luminance. The display module 1703 is configured to display the target image at the target backlight luminance.

In an embodiment, the obtaining module 1701 is configured to receive a bitstream and decode the bitstream to obtain the hdrLayer.

In an embodiment, the obtaining module 1701 is configured to: receive a bitstream and decode the bitstream to obtain N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain the hdrLayer.

In an embodiment, the obtaining module 1701 is configured to: generate N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain the hdrLayer.

In an embodiment, the obtaining module 1701 is configured to process the initial backlight luminance based on a preset backlight adjustment ratio to obtain the target backlight luminance.

In an embodiment, the high-luminance enhancement data further includes metadata; and the obtaining module 1701 is configured to: obtain a backlight adjustment ratio based on the metadata; and process the initial backlight luminance based on the backlight adjustment ratio to obtain the target backlight luminance.

In an embodiment, the adjustment module 1702 is configured to: obtain a target weight based on the hdrLayer; and perform luminance adjustment on the to-be-processed image based on the target weight to obtain the target image.

In an embodiment, the adjustment module 1702 is configured to divide a first pixel value in the hdrLayer by a preset threshold to obtain a first weight value of the first pixel value, where the first pixel value is any pixel value in the hdrLayer, and the target weight includes the first weight value.

In an embodiment, the adjustment module 1702 is configured to: obtain a pixel adjustment coefficient; obtain an adjusted image based on the pixel adjustment coefficient and the to-be-processed image; and obtain the target image based on the to-be-processed image, the adjusted image, and the target weight.

In an embodiment, the N×M groups of parameters are obtained by using a machine learning model, or the N×M groups of parameters are obtained based on a histogram of the to-be-processed image.

In an embodiment, the metadata includes maximum luminance of a capture scene; and the obtaining module 1701 is configured to: obtain a first ratio based on the maximum luminance of the capture scene, where the first ratio is a ratio of luminance perception of human eyes in the capture scene to white diffuse reflection perception; obtain a second ratio based on the first ratio, where the second ratio is a ratio of luminance perception of human eyes on a display side to white diffuse reflection perception, and the second ratio is less than or equal to the first ratio; and obtain the backlight adjustment ratio based on the second ratio.

In an embodiment, the obtaining module 1701 is configured to calculate the first ratio based on the following formula:

$$P1 = L1^{1/\gamma s},$$

where

P1 indicates the first ratio;

$$L1 = \frac{Lmax}{2 \times pi},$$

where Lmax indicates the maximum luminance of the capture scene; and $$\gamma s = 2.3 - \frac{\log\left(\frac{L1}{50}\right)}{10}.$$

In an embodiment, the obtaining module 1701 is configured to calculate the second ratio based on the following formula:

$$P2 = a \times P1,$$

where

P2 indicates the second ratio; and a indicates a preset coefficient, and a≤1.

In an embodiment, the obtaining module 1701 is configured to calculate the backlight adjustment ratio based on the following formula:

$$gainBL = \frac{P2^{\gamma d}}{L2},$$

where gainBL indicates the backlight adjustment ratio;

$$L2 = \frac{AmbientLum}{2 \times pi},$$

where AmbientLum indicates intensity of ambient light; and $$\gamma d = 2.3 - \frac{\log\left(\frac{L2}{50}\right)}{10}.$$

In an embodiment, the metadata is obtained in the following embodiment: decoding a bitstream to obtain the metadata; or receiving a bitstream, decoding the bitstream to obtain a photographing parameter of a capture scene, and then obtaining the metadata through calculation based on the photographing parameter.

In an embodiment, the metadata further includes minimum luminance of the capture scene and/or a dynamic range of the capture scene.

The apparatus in this embodiment may be configured to perform the technical solution in the method embodiment shown in FIG. 14. Implementation principles and technical effect thereof are similar. Details are not described herein again.

Figure 18:
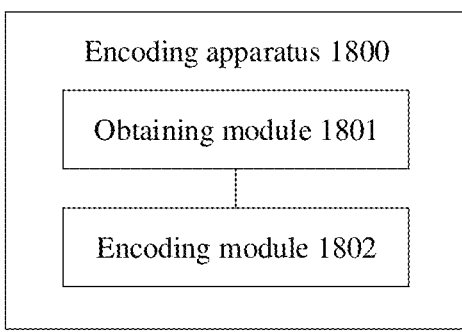
FIG. 18 is a diagram of an example structure of an encoding apparatus 1800 according to an embodiment of this application.

FIG. 18 is a diagram of an example structure of an encoding apparatus 1800 according to an embodiment of this application. As shown in FIG. 18, the encoding apparatus 1800 in this embodiment may be used for an encoder side 20. The encoding apparatus 1800 may include an obtaining module 1801 and an encoding module 1802.

The obtaining module 1801 is configured to: obtain a to-be-processed image; and obtain metadata, where the metadata includes maximum luminance of a capture scene. The encoding module 1802 is configured to encode the to-be-processed image and the metadata to obtain a first bitstream.

In an embodiment, the obtaining module 1801 is further configured to generate N×M groups of parameters, where each group of parameters includes k parameters, the N×M groups of parameters correspond to N×M image blocks included in the to-be-processed image, both N and M are positive integers, N×M>1, and k>1; and the encoding module 1802 is further configured to encode the N×M groups of parameters to obtain a second bitstream.

In an embodiment, the obtaining module 1801 is further configured to: generate N×M groups of parameters, where each group of parameters includes k parameters, the N×M groups of parameters correspond to N×M image blocks included in the to-be-processed image, both N and M are positive integers, N×M>1, and k>1; and process the corresponding image blocks based on the N×M groups of parameters respectively to obtain a high dynamic range layer hdrLayer; and the encoding module is further configured to encode the hdrLayer to obtain a third bitstream.

In an embodiment, the N×M groups of parameters are obtained by using a machine learning model, or the N×M groups of parameters are obtained based on a histogram of the to-be-processed image.

In an embodiment, the obtaining module 1801 is configured to: obtain the metadata based on a long-exposure picture, a normal-exposure picture, and a short-exposure picture; or obtain the metadata through calculation based on a preset photographing parameter.

In an embodiment, the metadata further includes minimum luminance of the capture scene and/or a dynamic range of the capture scene.

The apparatus in this embodiment may be configured to perform the technical solution in the method embodiment shown in FIG. 5. Implementation principles and technical effect thereof are similar. Details are not described herein again.

In addition, this application further provides a computer-readable storage medium, including a computer program. When the computer program is executed on a computer, the computer is enabled to perform the technical solution in the method embodiment shown in FIG. 5 or FIG. 14.

This application further provides a computer program product. The computer program product includes instructions. When the instructions are run on a computer or a processor, the computer or the processor is enabled to implement the technical solution in the method embodiment shown in FIG. 5 or FIG. 14.

This application further provides a bitstream. The bitstream may be stored in a computer-readable storage medium, or may be transmitted in a form of a signal, for example, an electromagnetic wave. The bitstream includes encoded image data and metadata, and the metadata includes maximum luminance of a capture scene. The capture scene is a scene in which a pre-encoding image is captured.

This application further provides a chip system. The chip system includes a logic circuit and an input/output interface. The input/output interface is configured to communicate with another communication apparatus outside the chip system. The logic circuit is configured to perform the technical solution in the method embodiment shown in FIG. 5 or FIG. 14.

During implementation, the operations in the foregoing method embodiments may be performed by a hardware integrated logic circuit in a processor or through instructions in a form of software. The processor may be a general-purpose processor, a DSP, an ASIC, a FPGA or another programmable logic device, a discrete gate or transistor logic device, or a discrete hardware component. The general-purpose processor may be a microprocessor, or the processor may be any conventional processor or the like. The operations of the methods disclosed in embodiments of this application may be directly performed by a hardware encoding processor, or performed by a combination of hardware and a software module in an encoding processor. The software module may be located in a mature storage medium in the art, for example, a random access memory, a flash memory, a read-only memory, a programmable read-only memory, an electrically erasable programmable memory, or a register. The storage medium is located in a memory, and a processor reads information in the memory and performs the operations in the foregoing methods based on hardware of the processor.

The memory in the foregoing embodiments may be a volatile memory or a non-volatile memory, or may include both a volatile memory and a non-volatile memory. The non-volatile memory may be a ROM, a programmable read-only memory (PROM), an erasable programmable read-only memory (erasable PROM, EPROM), an electrically erasable programmable read-only memory (electrically EPROM, EEPROM), or a flash memory. The volatile memory may be a RAM and serves as an external cache. By way of example but not limitative description, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the system and the method described in this specification is intended to include but is not limited to these memories and any other appropriate type of memory.

A person of ordinary skill in the art may be aware that units and algorithm operations in examples described with reference to embodiments disclosed in this specification can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It can be clearly understood by a person skilled in the art that, for ease and brevity of description, for detailed working processes of the foregoing system, apparatus, and unit, reference may be made to corresponding processes in the foregoing method embodiments. Details are not described herein again.

In several embodiments provided in this application, it should be understood that the disclosed system, apparatus, and method may be implemented in other embodiments. For example, the described apparatus embodiments are merely examples. For example, division into the units is merely logical function division and may be other division in actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts shown as units may or may not be physical units, to be specific, may be located in one place, or may be distributed on a plurality of network units. Some or all of the units may be selected according to actual requirements to achieve objectives of solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to the conventional technology, or some of the technical solutions may be implemented in a form of a software product. The computer software product is stored in a storage medium, and includes several instructions for instructing a computer device (a personal computer, a server, a network device, or the like) to perform all or some of the operations of the methods in embodiments of this application. The storage medium includes any medium that can store program code, for example, a USB flash drive, a removable hard disk, a ROM, a RAM, a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method of displaying an image for an electronic device, comprising:

obtaining a to-be-processed image;

obtaining high-luminance enhancement data comprising a high dynamic range layer (hdrLayer);

obtaining initial backlight luminance of the electronic device;

obtaining target backlight luminance of the electronic device based on the initial backlight luminance;

performing luminance adjustment on the to-be-processed image based on the hdrLayer to obtain a target image for the target backlight luminance; and displaying the target image at the target backlight luminance;

wherein:

obtaining the target backlight luminance of the electronic device comprises:

obtaining a backlight adjustment ratio based on metadata of the high-luminance enhancement data; and processing the initial backlight luminance based on the backlight adjustment ratio to obtain the target backlight luminance; and obtaining the backlight adjustment ratio comprises:

obtaining the metadata of the high-luminance enhancement data, wherein the metadata of the high-luminance enhancement data comprises maximum luminance of a capture scene;

obtaining a first ratio based on the maximum luminance of the capture scene, wherein the first ratio is a ratio of luminance perception of human eyes in the capture scene to white diffuse reflection perception;

obtaining a second ratio based on the first ratio, wherein the second ratio is a ratio of luminance perception of human eyes on a display side to white diffuse the reflection perception, and the second ratio is less than or equal to the first ratio; and obtaining the backlight adjustment ratio based on the second ratio.

2. The method according to claim 1, wherein the metadata of the high-luminance enhancement data is obtained by:

decoding a bitstream to obtain the metadata of the high-luminance enhancement data; or decoding the bitstream to obtain a photographing parameter of the capture scene, and obtaining the metadata of the high-luminance enhancement data based on the photographing parameter.

3. The method according to claim 1, wherein obtaining the high-luminance enhancement data comprises:

receiving a bitstream, and decoding the bitstream to obtain N×M groups of parameters, wherein each group of parameters of the N×M groups of parameters comprises k parameters, the NM groups of parameters correspond to N×M image blocks comprised in the to-be-processed image, N and M are positive integers, N×M>1, and k>1; and processing the corresponding N×M image blocks based on the N×M groups of parameters, respectively, to obtain the hdrLayer.

4. The method according to claim 1, wherein obtaining the high-luminance enhancement data comprises:

generating N×M groups of parameters, wherein each group of parameters of the N×M groups of parameters comprises k parameters, the N×M groups of parameters correspond to N×M image blocks comprised in the to-be-processed image, N and M are positive integers, N×M>1, and k>1; and processing the corresponding N×M image blocks based on the N×M groups of parameters, respectively, to obtain the hdrLayer.

5. The method according to claim 4, wherein the N×M groups of parameters are obtained using a machine learning model, or the N×M groups of parameters are obtained based on a histogram of the to-be-processed image.

6. The method according to claim 1, wherein performing the luminance adjustment on the to-be-processed image comprises:

obtaining a target weight based on the hdrLayer; and performing the luminance adjustment on the to-be-processed image based on the target weight to obtain the target image.

7. The method according to claim 6, wherein obtaining the target weight comprises:

dividing a first pixel value in the hdrLayer by a preset threshold to obtain a first weight value of the first pixel value, wherein the first pixel value is a pixel value in the hdrLayer, and the target weight comprises the first weight value.

8. The method according to claim 6, wherein performing the luminance adjustment on the to-be-processed image comprises:

obtaining a pixel adjustment coefficient;

obtaining an adjusted image based on the pixel adjustment coefficient and the to-be-processed image; and obtaining the target image based on the to-be-processed image, the adjusted image, and the target weight.

9. The method according to claim 1, wherein obtaining the first ratio comprises:

calculating the first ratio based on the following:

$$P1 = L1^{1/\gamma s},$$

wherein

P1 is the first ratio;

$$L1 = \frac{Lmax}{2 \times pi},$$

wherein Lmax is the maximum luminance of the capture scene; and $$\gamma s = 2.3 - \frac{\log\left(\frac{L1}{50}\right)}{10}.$$

10. A decoder, comprising:

one or more processors; and a memory, configured to store one or more programs, which when executed by the one or more processors, cause the one or more processors to:

obtain a to-be-processed image;

obtain high-luminance enhancement data comprising a high dynamic range layer (hdrLayer);

obtain initial backlight luminance of an electronic device;

obtain target backlight luminance of the electronic device based on the initial backlight luminance;

perform luminance adjustment on the to-be-processed image based on the hdrLayer to obtain a target image for the target backlight luminance; and display the target image at the target backlight luminance; wherein:

when obtaining the target backlight luminance of the electronic device, the one or more programs are executed by the one or more processors, to cause the one or more processors to:

obtain a backlight adjustment ratio based on metadata of the high-luminance enhancement data; and process the initial backlight luminance based on the backlight adjustment ratio to obtain the target backlight luminance; and when obtaining the backlight adjustment ratio, the one or more programs are executed by the one or more processors, to cause the one or more processors to:

obtain the metadata of the high-luminance enhancement data, wherein the metadata of the high-luminance enhancement data comprises maximum luminance of a capture scene;

obtain a first ratio based on the maximum luminance of the capture scene, wherein the first ratio is a ratio of luminance perception of human eyes in the capture scene to white diffuse reflection perception;

obtain a second ratio based on the first ratio, wherein the second ratio is a ratio of luminance perception of human eyes on a display side to white diffuse the reflection perception, and the second ratio is less than or equal to the first ratio; and obtain the backlight adjustment ratio based on the second ratio.

11. The decoder according to claim 10, wherein the metadata of the high-luminance enhancement data is obtained by:

decoding a bitstream to obtain the metadata of the high-luminance enhancement data; or decoding the bitstream to obtain a photographing parameter of the capture scene, and obtaining the metadata of the high-luminance enhancement data based on the photographing parameter.

12. A non-transitory computer-readable storage medium, comprising a computer program, which when executed on a computer, causes the computer to perform operations, the operations comprising:

obtaining a to-be-processed image;

obtaining high-luminance enhancement data comprising a high dynamic range layer (hdrLayer);

obtaining initial backlight luminance of an electronic device;

obtaining target backlight luminance of the electronic device based on the initial backlight luminance;

performing luminance adjustment on the to-be-processed image based on the hdrLayer to obtain a target image for the target backlight luminance; and displaying the target image at the target backlight luminance;

wherein:

obtaining the target backlight luminance of the electronic device comprises:

obtaining a backlight adjustment ratio based on metadata of the high-luminance enhancement data; and processing the initial backlight luminance based on the backlight adjustment ratio to obtain the target backlight luminance; and obtaining the backlight adjustment ratio comprises:

obtaining the metadata of the high-luminance enhancement data, wherein the metadata of the high-luminance enhancement data comprises maximum luminance of a capture scene;

obtaining a first ratio based on the maximum luminance of the capture scene, wherein the first ratio is a ratio of luminance perception of human eyes in the capture scene to white diffuse reflection perception;

obtaining a second ratio based on the first ratio, wherein the second ratio is a ratio of luminance perception of human eyes on a display side to white diffuse the reflection perception, and the second ratio is less than or equal to the first ratio; and obtaining the backlight adjustment ratio based on the second ratio.

13. The non-transitory computer-readable storage medium according to claim 12, wherein obtaining the high-luminance enhancement data comprises:

receiving a bitstream, and decoding the bitstream to obtain N×M groups of parameters, wherein each group of parameters of the N×M groups of parameters comprises k parameters, the N×M groups of parameters correspond to N×M image blocks comprised in the to-be-processed image, N and M are positive integers, N×M>1, and k>1; and processing the corresponding N×M image blocks based on the N×M groups of parameters, respectively, to obtain the hdrLayer.

* * * * *